United States Patent [19]
Melchior

[11] 3,988,894
[45] Nov. 2, 1976

[54] METHODS OF SUPERCHARGING AN ENGINE, PREFERABLY A DIESEL ENGINE IN SUCH SUPERCHARGED ENGINES, AND IN SUPERCHARGING UNITS FOR SUCH ENGINES

[75] Inventor: Jean F. Melchior, Paris, France

[73] Assignee: Etat Francais, Paris, France

[22] Filed: Jan. 29, 1974

[21] Appl. No.: 437,748

Related U.S. Application Data

[63] Continuation-in-part of Ser. No. 384,566, Aug. 1, 1973, abandoned, which is a continuation of Ser. No. 139,080, April 30, 1971, abandoned, and a continuation-in-part of Ser. No. 345,968, March 29, 1973, abandoned.

[52] U.S. Cl. .................................. 60/606; 60/619
[51] Int. Cl.² .................. F02B 33/40; F02B 33/44
[58] Field of Search ............ 60/599, 606, 608, 614, 60/615, 617, 619

[56] References Cited
UNITED STATES PATENTS

| | | | |
|---|---|---|---|
| 2,633,698 | 4/1953 | Nettel | 60/599 |
| 3,096,615 | 7/1963 | Zuhn | 60/606 |
| 3,423,927 | 1/1969 | Schenenberg | 60/606 |
| 3,676,999 | 7/1972 | Oldfield | 60/606 |

*Primary Examiner*—Carlton R. Croyle
*Assistant Examiner*—L. J. Casaregola

[57] ABSTRACT

An internal combustion engine of the expansible chamber type and preferably a diesel engine is equipped with a turbo-compressor unit, comprising at least one compressor and at least one turbine, and at least one bypass pipe enabling direct and permanent passage for the air delivered through the compressor to the turbine inlet.

The diesel engine is supercharged by the compressor driven by the turbine. Regulating means are provided to limit the rotary speed of the supercharging unit so that it operates at or above a minimum threshold value such that the engine, which has a compression ratio of less than 12, can be started and kept running at low power without difficulty. For engines requiring scavenging, throttle means with variable passage cross section are arranged so as to be traversed by generating between the upstream and downstream parts of the bypass pipe a pressure difference which is an increasing function of the pressure existing in the upstream part regardless of the engine speed and therefore which is independent of the air flow passing through said throttle means. The increasing function may be a linear or substantially linear function. A combustion chamber is arranged upstream of the turbine and supplied by air which has passed through the bypass pipe, by fuel under the control of the regulating means and also, in some embodiments, by exhaust gases from the engine.

34 Claims, 26 Drawing Figures

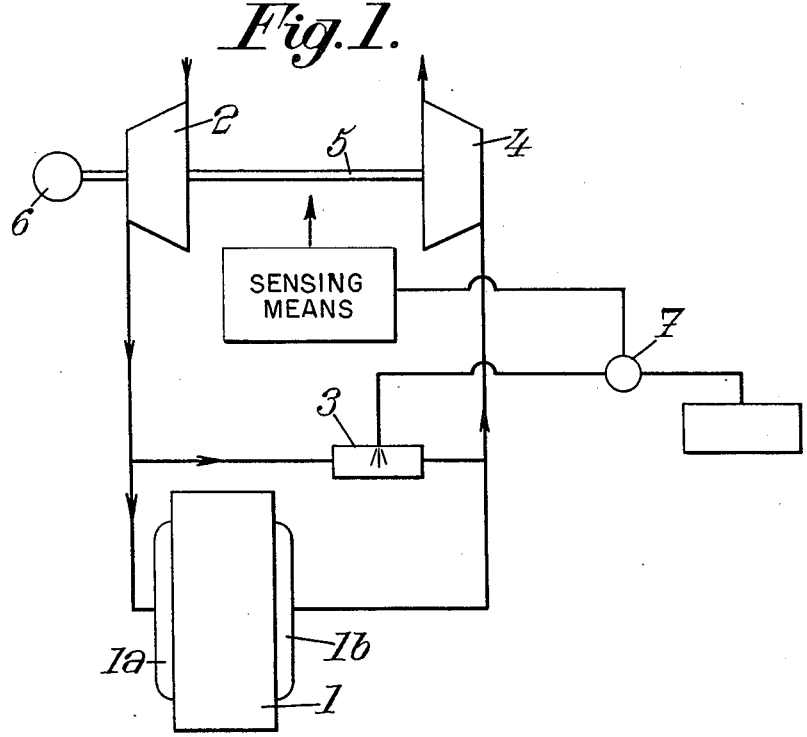
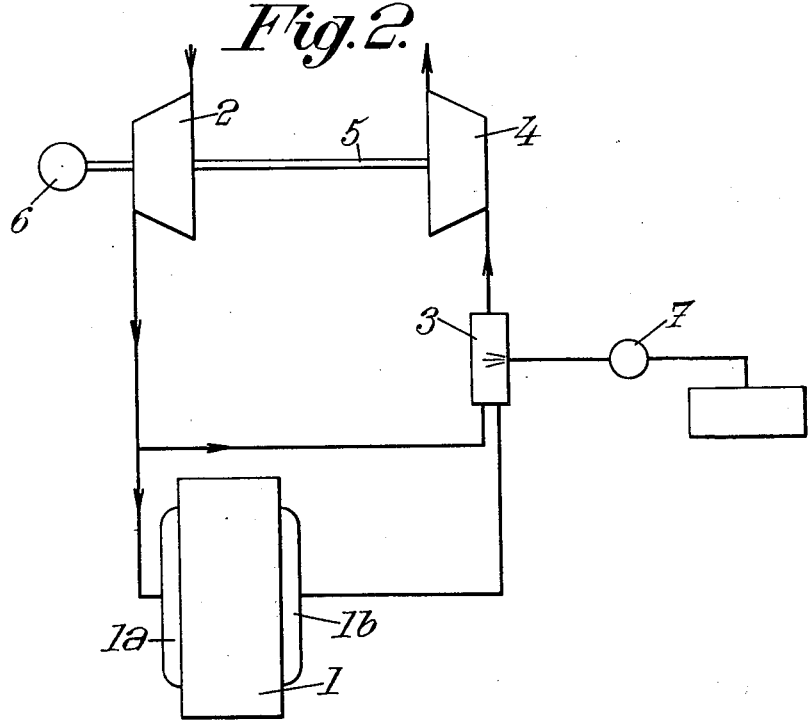

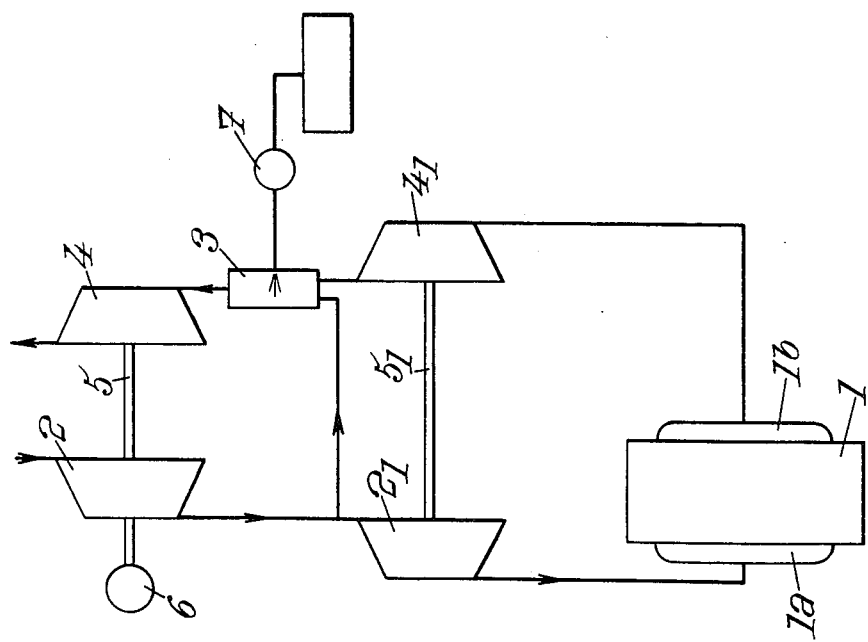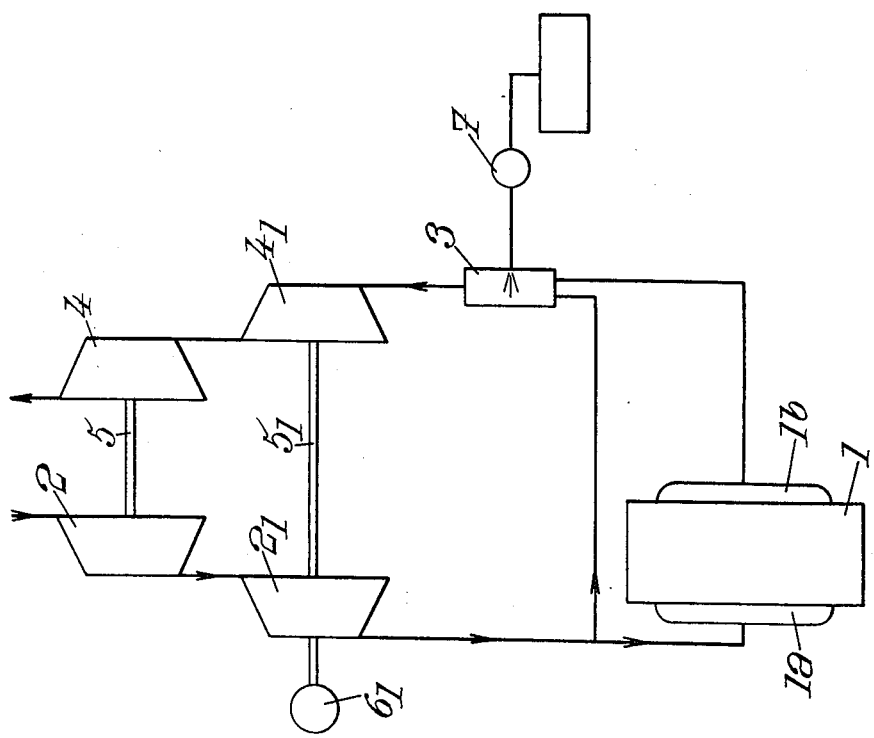

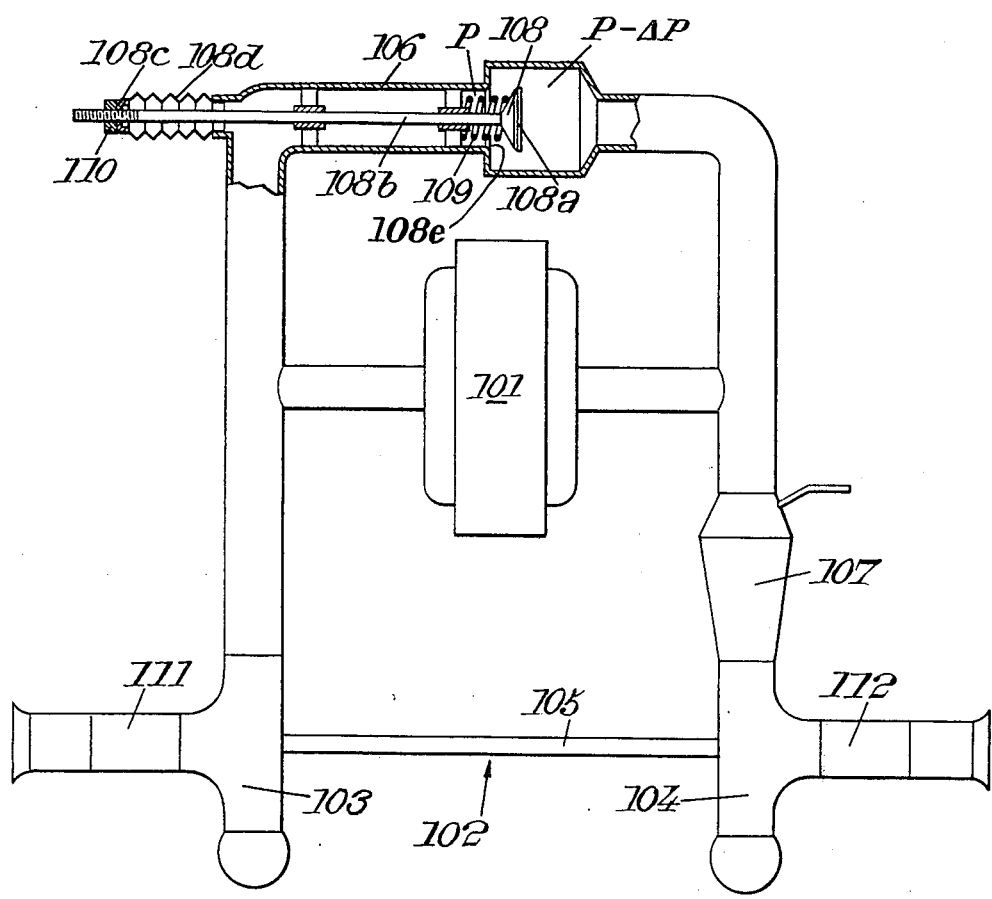

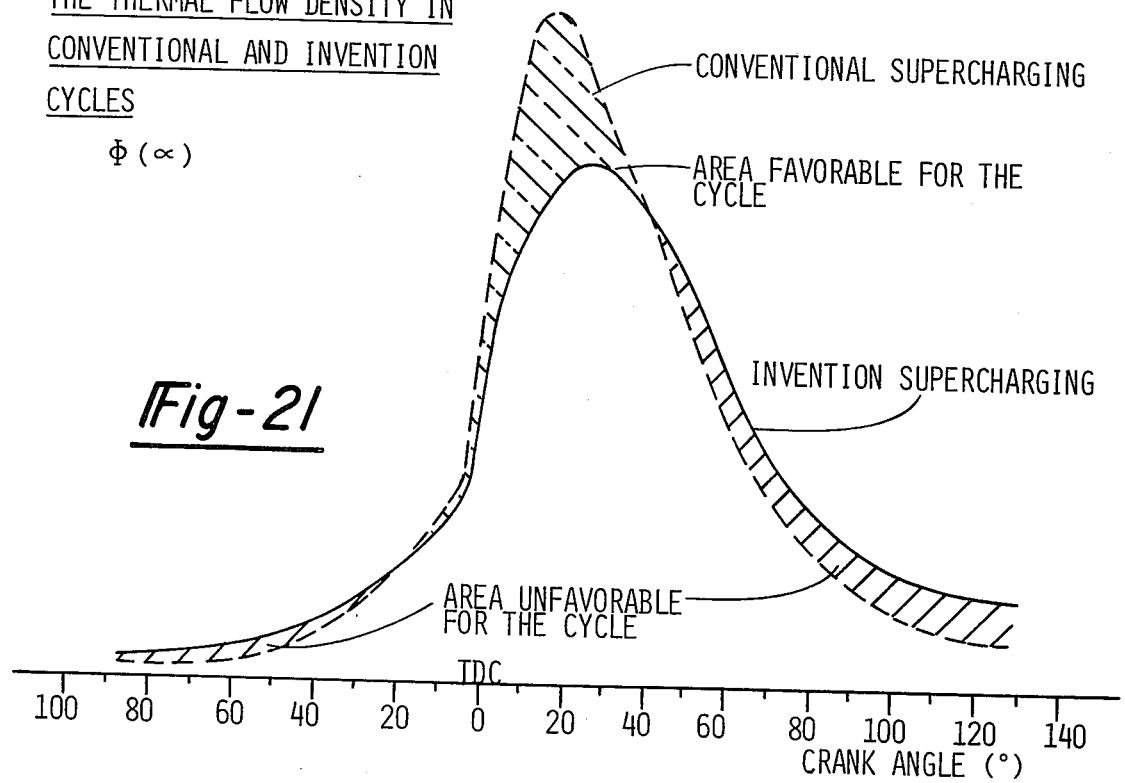
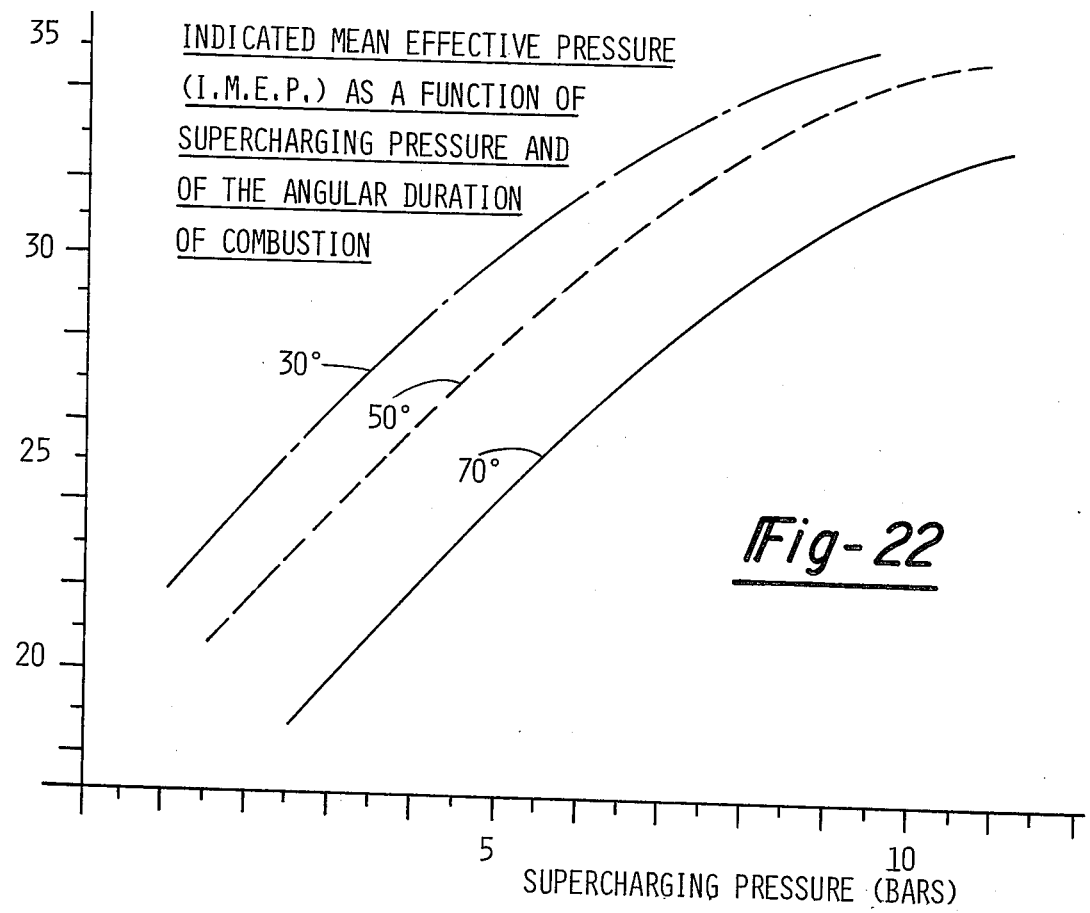

METHODS OF SUPERCHARGING AN ENGINE, PREFERABLY A DIESEL ENGINE IN SUCH SUPERCHARGED ENGINES, AND IN SUPERCHARGING UNITS FOR SUCH ENGINES

This application is a continuation-in-part of my prior copending application Ser. No. 384,566, filed in the United States Patent Office on Aug. 1, 1973, now abandoned, which in turn is a continuation of my prior copending application Ser. No. 139,080, filed in the United States Patent Office on Apr. 30, 1971, now abandoned, and claiming the benefit of the priority date of my French application Ser. No. 70/16289, filed May 5, 1970; and is also a continuation-in-part of my prior copending application Ser. No. 345,968, filed Mar. 29, 1973 in the United States Patent Office, now abandoned, and claiming the benefit of the priority dates of my French applications Ser. No. 72/12113, filed Apr. 6, 1972, and Ser. No. 73/10041, filed Mar. 21, 1973.

The invention relates to supercharging methods for internal combustion engines of the expansible combustion chamber type, preferably a diesel engine with a supercharging unit comprising a compressor supplying fresh air in parallel to the engine and to a combustion chamber, and a turbine supplied with combustion gas by the engine and said combustion chamber, the said turbine driving in rotation the said compressor, independent starting means being provided to bring the turbine-compressor assembly to self-maintaining operation independent of the engine.

The invention also relates to diesel engines supercharged by a supercharging unit comprising a compressor, supplying fresh air in parallel to the engine and to a combustion chamber, and a turbine supplied with combustion gas by the engine and the abovesaid combustion chamber, the abovesaid turbine driving said compressor in rotation, independent starting means being provided to bring the turbine-compressor assembly to self-maintaining operation independent of the engine.

The invention relates also to supercharging units for internal combustion engines, preferably of the diesal type, comprising a compressor supplying fresh air to an auxiliary combustion chamber and also to the engine combustion chamber via first connecting means connected to an intake manifold of an engine, and a turbine supplied with combustion gases provided by said auxiliary combustion chamber and by the engine combustion chamber via second connecting means connected to the exhaust manifold of said engine, said turbine rotating said compressor, independent starting means being provided to bring the turbine-compressor assembly to self-maintaining operation.

As set forth in more detail following the detailed description of the embodiments shown in FIGS. 1–13, it has been appreciated that it would be advantageous, especially from the point of view of specific power/-stroke volume ratio and from the point of view of robustness and simplicity, to provide supercharged diesel engines having a low compression ratio, less than 12, and which can be as low a value as 8 or even 6.

Now it is known that, all things being otherwise equal, reduction of the compression ratio of a supercharged diesel engine causes the appearance, below a certain limiting compression ratio, which is situated around 12, of impossibilities of starting and difficulties of low power operation, and this by reason of the fact that the temperature of selfignition of the fuel is no longer reached at the end of the compression stroke.

It is a specific object of the invention to improve the operation of supercharged diesel engines and to permit, for engines whose compression ratio is less than 12, starting without having to resort to any special starting method, and correct operation at idle and low power.

The supercharging method according to a preferred embodiment of the invention is characterized by the fact that, the engine having a compression ratio less than 12, the minimal rotary speed of its supercharging unit is limited to a threshold value sufficient to create, in the intake pipe of the engine, conditions of temperature and of pressure enabling its starting and its operation at low power, this threshold value being all the higher, for a given supercharging unit, as the compression ratio of the engine is lower.

Preferably, the abovesaid threshold value is obtained by limiting, i.e., controlling or regulating, the supply of fuel to the combustion chamber.

The diesel engine according to a preferred embodiment of the invention is characterized by the fact that it has a compression ratio less than 12, by the fact that regulating means for the speed of its supercharging unit are provided and are arranged so that the minimal rotary speed of this supercharging unit is limited to a threshold value sufficient to create, in the intake pipe of the engine, conditions of temperature and of pressure enabling its starting and its operation at slow speed, this threshold value being all the higher, for a given supercharging unit, as the compression ratio of the engine is lower.

Preferably, the abovesaid regulating means are constituted by a supply device limiting, i.e., controlling or regulating, the flow rate of fuel introduced into the combustion chamber.

The supercharging unit according to a preferred embodiment of the invention is characterized by the fact that first connecting means are provided for the compressor to supply with fresh air, in parallel, the combustion chamber and the intake pipe of a diesel engine with a compression ratio less than 12, by the fact that second connecting means are provided so that the turbine can be supplied with the combustion gas by the combustion chamber and by the exhaust pipe of the abovesaid diesel engine, and by the fact that regulating means of the speed of the supercharging unit are provided and are arranged so that the minimal rotary speed of this supercharging unit is limited to a threshold value sufficient to create, in the intake pipe of the engine, conditions of temperature and of pressure enabling its starting and its operation at low power, this threshold value being all the higher, for a given supercharging unit, as the compression ratio of the engine concerned is lower.

The abovesaid regulating means can comprise an actuating member which can modify the threshold value according to the compression ratio of the engine concerned.

To a first approximation, the power of an engine is proportional to the amount of air inspired. The power of a given engine, whose rotary speed is fixed, hence can only be increased at the cost of an increase in the density of the intake air. So it is necessary to increase the pressure and to reduce the temperature of this air. On the other hand to respect the longevity of the engine, the maximal admissible pressure must not be exceeded and the temperature of the gases in the cylinder must not be unduly raised. A considerable increase in intake pressure is hence only possible at the cost of a correlated lowering of the compression ratio which is accompanied by lesser heating of the air during the compression stroke. Below a limiting volumetric expression ratio of the engine comprised between 12 and 17 according to the bore, this heating may become insufficient to enable self-ignition of the fuel at least at starting, idling or low power operation.

In accordance with one feature of the present invention, such relatively low compression ratios comprised between about 6 and 10, as the case may be, are employed, while around the engine an artificial atmosphere is maintained under sufficient pressure and temperature to palliate the lack of compression in the cylinder and this pressurized atmosphere is established prior to the starting of the engine. The pressure of this atmosphere is sufficiently high to enable easy starting up at the lowest ambient temperatures. The low compression ratio gives the engine a smoothness of operation which is manifested by a considerable reduction in the characteristic knock or chatter of a diesel engine and less wear of the moving connecting parts. It makes possible an excess of air in the cylinder, which in turn lowers the maximal and average temperatures of the gases and hence the thermal load on the engine. Moreover, this excess of air reduces the creation of nitrogen oxide (due to the lowering of temperatures) and the formation of unburnt products and of smoke (due to the excess of oxygen at all speeds).

To provide the high pressure of air required, the turbocompressor is operated within the narrow range of good compression yields, that is to say like a gas turbine. The ability to operate in this high yield mode is achieved by the system of the invention due to the previously described parallel connection in the form of a bypass connecting the compressor outlet to the turbine inlet whose permeability is controlled to maintain the good yield of the compressor. This bypass also supplies fresh air to a combustion chamber which is situated upstream of the turbine and which enables self-sustaining operation of the turboblower. The latter can then be started up prior to the engine and kept above a minimal speed in the whole range of operation of the engine. The artificial pressurized atmosphere defined above is thus realized.

The above features enable, moreover, the obtaining of maximum torque at all rotary speeds, the supercharging pressure being adjustable independently of the engine speed. The increase in power is not obtained by increasing the forces on the connecting rod system but by increasing the duration during which they are applied. Therefore, the basic construction of the engine can be preserved in adapting a conventional engine to the system of the invention. Similarly, since the average temperature of the gases in the cylinder is lower, the water circulation of the original engine is sufficient for the increase in power and hence the original cooling system need not be modified.

The method of the invention is applicable to any existing self-ignition internal combustion engine and enables the obtaining of three to four times the power of the unsupercharged engine without changing is operating life. Relative to conventional supercharging, the power gain thus obtained can go from 50 to 150%, depending upon the ratio of initial supercharging employed. The increase in power is also accompanied by a certain number of secondary advantages: high torque at low speed, much reduced noise level, exhaust of low polluting effect, ease of cold starting, easy correction of atmospheric variations, possibility of idling at very low speed, and reduction in the specific bulk of the cooling system.

The system of the invention is readily adapted to the majority of self-ignition internal combustion engines. It requires no internal modification other than a different geometry of the combustion chambers. Moreover, the very high pressure necessary for the method is provided by a supercharging system which is used instead and in place of conventional supercharging devices of similar bulk.

In such engines of the invention, the parallel branch of the aforesaid connecting means preferably comprises a bypass pipe enabling direct and permanent passage of fresh air delivered by the compressor to the exhaust gases emerging from the engine. A combustion chamber is then generally provided upstream of the turbine, this combustion chamber being supplied by the exhaust gases and by the fresh air taken from the abovesaid branch pipe.

It is a further object of the invention to adapt the turbo-compressor group to high supercharging pressures due to operation of the compressor close to the surge or pumping line, that is to say with optimum yield.

It is yet another object of the invention to enable good scavenging of the engine due to a difference of pressure maintained between the intake and the exhaust.

It is another object of the invention, in engines of the above character, to reduce the work of discharging exhaust gases, which hence enables the power of the engine to be increased (by increasing the mean effective pressure) and to reduce its consumption.

In order to achieve such scavenging the engine according to another embodiment of the invention is provided with throttle means with variable passage cross section, arranged so as to be traversed by the air passing through the bypass pipe, these throttle means generating between the upstream part of the bypass pipe (the part connected to the compressor) and the downstream part of the bypass pipe (the part connected to the turbine, if necessary through the combustion chamber) a difference in pressure which is an increasing function, preferably linear or substantially linear, of the pressure existing in the upstream part regardless of the engine speed and therefore which is independent of the air flow passing through said throttle means.

It will hence be understood that the work of discharging the exhaust gases being reduced, the brake mean effective pressure (b.m.e.p.) is increased to a value equal to the aforesaid difference in pressure between the pressure upstream of the throttle means and the pressure downstream of said throttle means.

Moreover, it is possible to make the engine operate at high supercharging pressures, the compressor operating close to the pumping limit.

Lastly, the existence of a difference in pressure maintained between the intake (pressure upstream of the throttle means) and the exhaust (pressure downstream of the throttle means) enables good scavenging of the engine.

According to one advantageous embodiment of the invention, the throttle means comprises a throttle member arranged in the bypass pipe and cooperating with a fixed seat.

This throttle member can be operatively coupled to, or may consist of, a balancing piston, one working surface of which is subjected to the pressure existing in the part upstream of the bypass pipe and of which a second working surface is subject to a counter pressure (atmospheric pressure or pressure comprised between atmospheric pressure and the pressure existing in the upstream part of the bypass pipe), and a third working surface of which is subjected to the pressure existing in the downstream part, and elastic return means being able to act in one sense or the other on the movable mechanism constituted by the throttle member and its balancing piston.

According to a particular feature of the invention, which is applied in the case where there is provided a combustion chamber which is supplied, with fresh air, through a primary air intake to introduce fresh air into a combustion zone, and through a secondary air intake to introduce fresh air into a mixing zone, the throttle means comprise, in parallel, first throttle means with variable passage cross section, arranged so as to be traversed by the secondary air, these first throttle means generating between the upstream part of the bypass pipe (the part connected to the compressor) and the downstream part of the bypass pipe (the part connected to the combustion chamber) a pressure difference which is an increasing function, preferably linear or substantially linear, of the pressure existing in the upstream part, and second throttle means with variable outlet cross section subjected to the difference of pressure generated by the first throttle means and arranged so as to be traversed by the primary air, these second throttle means regulating the flow-rate of primary air by offering an outlet cross section to this primary air which is servocoupled to the pressure existing in the downstream part or the upstream part of the bypass pipe, this servocoupling being according to a predetermined relationship.

Preferably, these second throttle means control in addition a regulating device for the flow-rate of fuel injected into the combination chamber so as to preserve, for flow-rates of primary air and of fuel, a ratio ensuring good combustion stability.

The invention, apart from the features which have been considered, consists of certain other objects, features and advantages which will be more explicitly discussed below.

The invention will, in any case, be better understood with the aid of the supplementary description which follows as well as of the accompanying drawings, which description and drawings relate to preferred embodiments of the invention and do not have, of course, any limiting character. In these drawings:

FIG. 1 is a diagrammatic view of a supercharged diesel engine, with one compression stage, constructed according to the invention and constituting a first embodiment.

FIG. 2 is a diagrammatic view of a supercharged diesel engine, with one compression stage, constructed according to the invention and constituting a second embodiment thereof.

FIGS. 7 and 8 show two variations of a supercharged diesel engine with two compression stages and constructed according to the invention in a manner similar to the embodiment of the supercharged diesel engine with one compression stage which is illustrated in FIG. 2.

FIG. 9 is a diagrammatic view of another embodiment of a supercharged diesel engine equipped with a combustion chamber with a single fresh air intake, and constructed according to the invention.

FIGS. 19, 20 and 21 are corresponding graphic comparative developments of temperature, heat transfer coefficients and thermal flow respectively.

FIG. 22 is a graph of indicated mean effective pressure as a function of the supercharging pressure and of the angular duration of combustion calculated for an engine supercharged pursuant to the invention.

Figure 3:
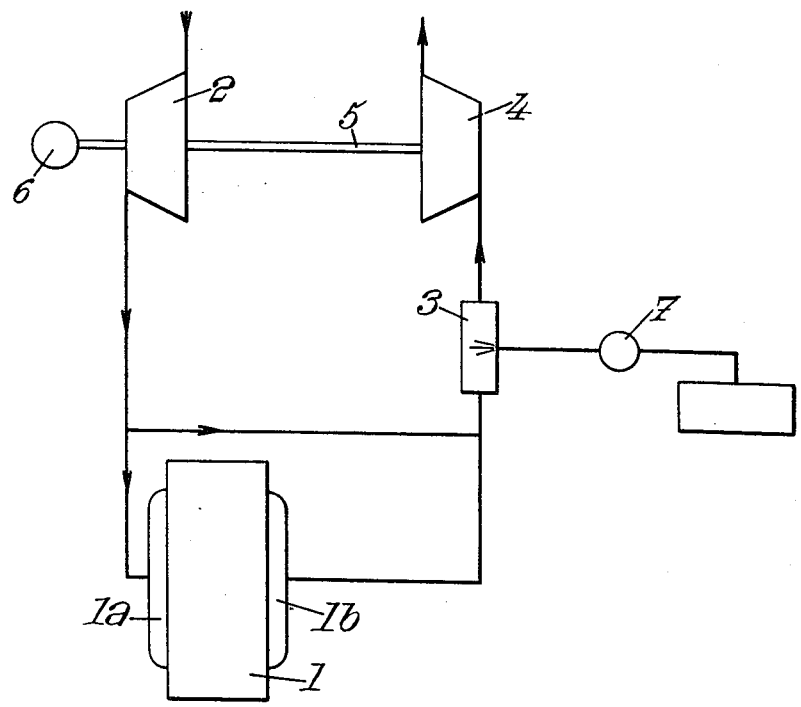
FIG. 3 is a diagrammatic view of a supercharged diesel engine, with one compression stage, constructed according to the invention and constituting a third embodiment thereof.

As shown in FIGS. 1–3, the diesel engine 1 is supercharged by a supercharging unit, with one compression stage, which comprises a compressor 2, supplying fresh air in parallel to the engine 1 and to a combustion chamber 3, and a turbine 4 supplied with combustion gas by the engine 1 and by the abovesaid combustion chamber 3. The turbine 4 rotates the compressor 2 through a connecting shaft 5. Independent starting means 6, which can be constituted by an electric motor associated with a clutch, are provided to bring the turbine 4-compressor 2 assembly into self-maintaining operation independent of the engine.

This engine has a compression ratio less than 12, and regulating means, that is to say, threshold fixing means for regulating the speed of the supercharging unit are provided and are arranged so that the minimal rotary speed of this supercharging unit is limited to, i.e., does not drop below, a threshold value sufficient to create, in the intake pipe i.e. of the engine 1, conditions of temperature and of pressure enabling its starting and its operation at slow speed.

This threshold value is all the higher, for a given supercharging unit, as the compression ratio of the engine is lower.

The said regulating means are constituted by a supply device 7 limiting or controlling the flow rate of fuel introduced into the combustion chamber 3, and such a supply device can be constituted by an electro-pump delivering a flow rate of fuel proportional to its supply voltage.

In the embodiment illustrated in FIG. 1, the combustion chamber 3 receives only fresh air coming from the compressor 2.

In the embodiment illustrated in FIG. 2, the combustion chamber 3 receives, on one hand, fresh air coming from the compressor 2, and, on the other hand, all or part of the combustion gases coming from the exhaust pipe 1b of the engine 1.

In the embodiment illustrated in FIG. 3, the combustion chamber 3 receives a mixture constituted by fresh air coming from the compressor 2 and by all or part of the combustion gases coming from the exhaust pipe 1b of the engine 1.

By way of example, if it is assumed that the diesel engine has a compression ratio of 8 and that the turbine and the compressor of the supercharging unit have an isentropic yield (adiabatic efficiency) of 0.75, there will be obtained for this supercharging unit a self-maintaining operation for a compression ratio in the compressor of 1.3, which will produce a rise in temperature in the compressor of about 30° C.

Now, in an engine of compression ratio 8, the minimal temperature in the intake pipe is about 80° C to obtain the auto-ignition temperature of the fuel at the end of the compression stroke.

To obtain this value of 80° C for an ambient temperature which will be assumed equal to 0° C, it is hence necessary that the temperature ratio in the compressor be equal to 1.3, or with an isentropic yield of 0.75, a pressure ratio equal to 2 in the compressor. It is this pressure ratio which fixes the threshold value of the rotary speed of the supercharging unit.

There will now be described, with reference to FIGS. 4–6, a supercharging unit with one compression stage, for a diesel engine. This supercharging unit comprises, a compressor 20 supplying fresh air to a combustion chamber 30, and a turbine 40 supplied with combustion gas by the abovesaid combustion chamber 30. The turbine 40 rotates the compressor 20 through a connecting shaft 50. Independent starting means 60, such as for example an electric motor associated with a clutch, are provided to bring the turbine 40-compressor 20 assembly to self-maintaining operation.

First connecting means 21 are provided in order that the compressor 20 may supply fresh air, in parallel to the combustion chamber 30 and the intake pipe of a diesel engine (not shown) with a compression ratio less than 12. Second connecting means 41 are provided so that the turbine 40 can be supplied with combustion gas by the combustion chamber 30 and by the exhaust pipe of the abovesaid diesel engine.

Regulating means for the speed of the supercharging unit are provided and are arranged so that the minimal rotary speed of this supercharging unit is limited to a threshold value sufficient to create, in the intake pipe of the engine, conditions of temperature and of pressure enabling its starting and its operation at slow speed. This threshold value is, all other conditions being kept the same, all the higher, for a given supercharging unit, as the compression ratio of the corresponding engine is low. These regulating means can be constituted by a supply device 70 for controlling the flow rate of fuel introduced into the combustion chamber 30; such a supply device can be constituted by an electro-pump delivering a flow rate of fuel proportional to its supply voltage. These regulating means can additionally comprise an actuating member which can modify the threshold value according to the compression ratio of the engine concerned.

Figure 4:
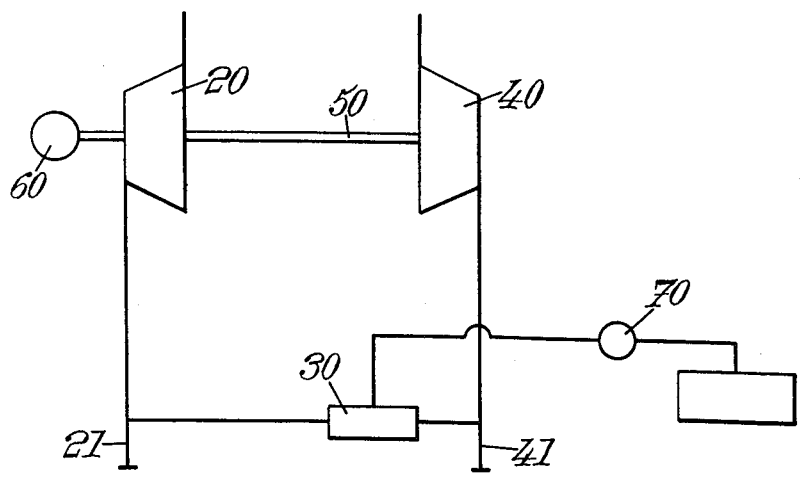
FIG. 4 shows a supercharging unit according to the invention, with one compression stage, and constructed in a manner analogous to the embodiment of the diesel engine shown in FIG. 1.

In the embodiment illustrated in FIG. 4, the combustion chamber 30 only receives fresh air coming from the compressor 20 when the supercharging unit cooperates with the engine.

Figure 5:
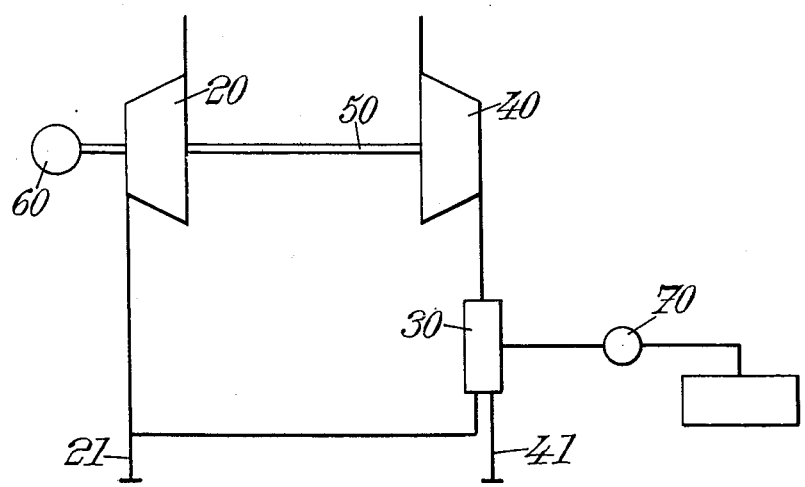
FIG. 5 shows a supercharging unit according to the invention, with one compression stage, and constructed according to the invention in a manner analogous to the embodiment of the diesel engine shown in FIG. 2.

In the embodiment illustrated in FIG. 5, the combustion chamber 30 receives, when the supercharging unit cooperates with the engine, on one hand, fresh air coming from the compressor 20, and, on the other hand, all or part of the combustion gases coming from the exhaust pipe of the said engine.

Figure 6:
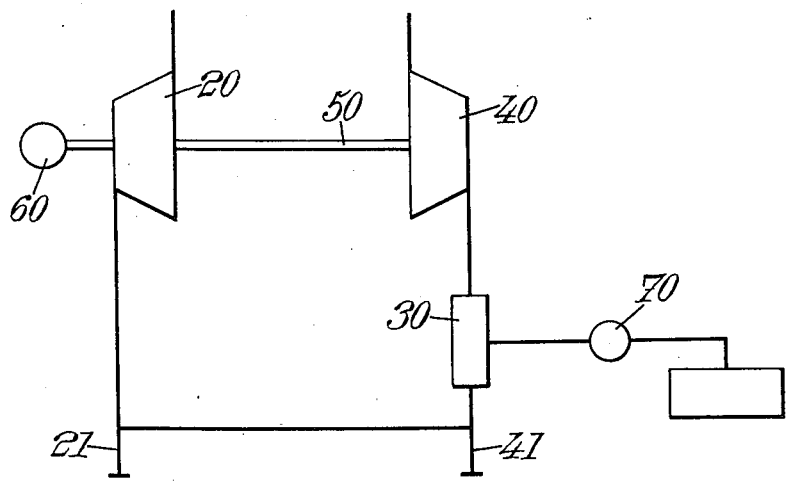
FIG. 6 shows a supercharging unit according to the invention, with one compression stage, and constructed in a manner similar to that of the embodiment of the diesel engine shown in FIG. 3.

In the embodiment illustrated in FIG. 6, the combustion chamber 30 receives, when the supercharging unit cooperates with the engine, a mixture constituted by fresh air coming from the compressor 20, and by all or part of the combustion gases coming from the exhaust pipe of the abovesaid engine.

In the foregoing, it has been assumed that the supercharged diesel engine according to the invention included a supercharging unit with one compression stage, but such a diesel engine can include a supercharging unit with two or more compression stages.

A supercharged diesel engine comprising a supercharging unit with two compression stages is illustrated in FIGS. 7 and 8, this diesel engine being assumed constructed in a manner similar to that of the embodiment illustrated in FIG. 2, the same reference numerals denoting the same members in FIGS. 7 and 8 and in FIG. 2, but modified by the index 1 when they relate to elements of the high pressure stage. This diesel engine hence comprises a supercharging unit with a low pressure stage, compressor 2-turbine 4, and a high pressure stage, compressor $2_1$- turbine $4_1$.

In the variation illustrated in FIG. 7, it is the high pressure compressor $2_1$ which supplies the combustion chamber 3, whilst in the variation illustrated in FIG. 8 it is the low pressure compressor 2 which supplies the combustion chamber 3. In FIG. 7 starting means $6_1$ are coupled to turbocompressor $2_1$–$4_1$ whereas in FIG. 8 starting means 6 are coupled to turbocompressor 2–4.

Of course, there can be envisaged other supercharging arrangements with two or several compression stages and the invention can be supplied also thereto.

It is the same for supercharging units which could have also two or several compression stages arranged in different ways, the invention being then applicable to such supercharging units.

The method of supercharging a diesel engine according to the invention is thus also applicable to a diesel engine with a supercharging unit with two or several compression stages arranged according to various systems.

The invention also enables the exploitation of supercharged diesel engines of which the compression ratio is less than 12, these diesel engines being capable of being started without resorting to any special starting process and capable of operating correctly at slow speed.

Moreover, the invention enables the obtaining, for such diesel engines of a satisfactory overall yield (said yield taking into account amounts of fuel injected into the diesel engine and into the combustion chamber).

Referring now in more detail to the embodiment shown in FIG. 9, the diesel engine shown therein is denoted by the reference numeral 101 and it is supercharged by a turbo-compressor unit denoted by the reference numeral 102.

This turbo-compressor unit 102 comprises a compressor 103 delivering compressed air to supply the engine through a pipe, and a turbine 104 driving said compressor 103 through a shaft 105, this turbine 104 being actuated by exhaust gases from the engine 101.

There is provided a bypass pipe 106 permitting direct and permanent passage of fresh air taken from the compressor 103 to the turbine 104.

Preferably a combustion chamber 107 is then provided upstream of the turbine 104, this combustion chamber 107 being supplied with exhaust gases from the internal combustion chamber of engine 101 and with fresh air taken from the bypass pipe 106.

According to this embodiment of the invention, there is provided throttle means 108 with variable outlet cross section, arranged so as to be traversed by the air flowing in the bypass pipe 106. As will be explained in more detail hereinafter, these means 108 generate between the upstream part of the bypass pipe 106 (the part connected to the compressor 103) and the downstream part of the bypass pipe 106 (the part connected to the turbine 104 through the combustion chamber 107) a difference of pressure $\Delta P$ which is an increasing function, preferably linear or substantially linear, of the pressure P existing in the upstream part, and hence which pressure difference $\Delta P$ is independent of the air flow rate through bypass pipe 106. This linear function may be written: $\Delta P = \alpha' P + \beta'$ $\alpha'$ and $\beta'$ denoting two coefficients.

In the embodiment of the invention illustrated in FIG. 9, these throttle means 108 comprise a throttle member 108a arranged in the bypass pipe 106 and cooperating with a fixed seat 108e.

This throttle member 108a can be carried by a stem 108b which slides in a cylinder, or better, which is connected to the bypass pipe 106 through a deformable wall 108d. The relationship between the diameter of the throttle member 108a and the diameter of the piston 108c establishes the coefficient $a'$ and is such that the said throttle member 108a is balanced (as set forth in more detail hereinafter), by the presssure P exerted on its upstream surface and the inner surface of the piston 108c, by the pressure P - $\Delta P$ exerted on its downstream surface, and by the atmospheric pressure exerted on the outer surface of the piston 108c or by a suitable counter pressure source.

Elastic return means may also act on the throttle member 108a. This elastic return means and the aforesaid counter pressure fix the value of the coefficient $\beta'$ of the relationship $\Delta P = \alpha' P + \beta'$. These elastic return means may be constituted by a spring 109 and/or by the elasticity itself of the deformable wall 108d.

To permit the adjustment of this coefficient $\beta'$, there may be provided regulating means enabling adjustment of the resultant force applied on the throttle member 108a by the elastic return means; these regulating means can be constituted by a nut 110 modifying the tension of the elastic return means said nut being carried by the outer threaded part of stem 108b and abutting piston 108c.

This feature is particularly advantageous since it enables the pressure difference created by the throttle means 108 to be adapted to the installation of which the supercharged engine forms part. In particular, this pressure difference can be adapted to the pressure losses which are created by a filtering device 111 situated at the intake of the compressor 103 and/or by a silencer device 112 located at the outlet of the turbine 104.

A viscous damping device, which will be more explicitly considered below, can advantageously act on the throttle member 108a in order to absorb vibration of aerodynamic origin to which said throttle member 108a can be subjected. This viscous damping device is preferably supplied from a source of viscous fluid under variable pressure.

Figure 9A:
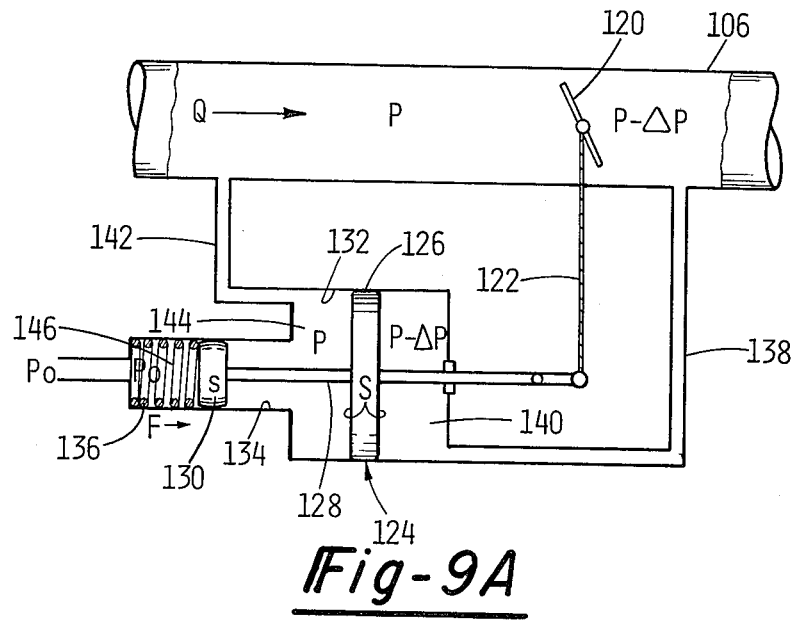
FIGS. 9A and 9B are diagrammatic views of second and third embodiments of throttle means which are equivalent to and may be substituted for the throttle means shown in FIG. 9.
Figure 9B:
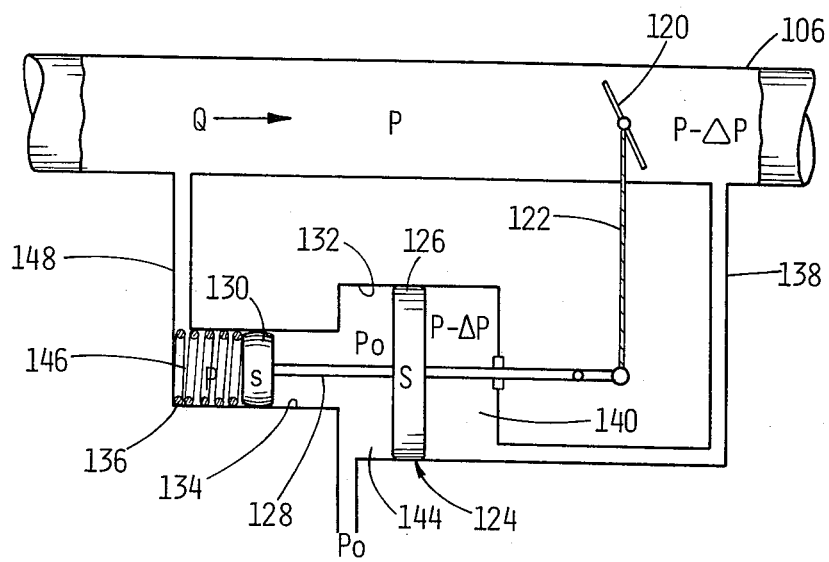

Referring to FIGS. 9A and 9B, there are diagrammatically illustrated alternative throttle means which may be substituted for the above described throttle means 108–108e, 109, 110 in the bypass pipe 106. Such alternative throttle means are also disclosed in greater detail and are claimed in a copending joint application of the inventor herein, Jean F. Melchior, and Thierry Andre, Ser. No. 615,775, filed Sept. 22, 1975, and assigned to the assignee herein. In FIGS. 9A and 9B a movable throttle member 120 is connected via a linkage 122 to a balancing piston 124 which is made up of a large diameter piston 126 connected by a rod 128 to a small diameter piston 130. Piston 126 slides in a cylinder 132 and piston 130 in a cylinder 134. A compression coil spring 136 is received in cylinder 134 to bias piston 124 to the right as viewed in FIGS. 9A and 9B. A conduit 138 provides communication between the portion of pipe 106 downstream of throttle 120 and chamber 140 of cylinder 132.

In FIG. 9A another conduit 142 connects the portion of pipe 106 upstream of throttle 120 with a chamber 144 of cylinder 132. The spring chamber 146 of cylinder 134 is connected to a source of the aforesaid counter pressure $P_o$. It will be observed that movement of piston 124 to the right opens throttle 120 and vice versa. Piston 126 has oppositely facing working surfaces of area S, and piston 130 has a working surface exposed to chamber 146 of area $s$. The values of S, $s$, counter pressure $P_o$ and the force F of spring 136 are suitably chosen such that the pressure drop $\Delta P$ equals the expression:

$$\frac{s}{S} P - \frac{F + P_o s}{S}$$

for the system of FIG. 9A, and this relationship will hold true regardless of the value of Q which is the air flow-rate passing through bypass 106 and past throttle 120. Thus, an increase in air flow rate Q for a given pressure P will produce an increase in the pressure drop $\Delta P$ downstream of throttle 120. This causes a decrease in the pressure in chamber 140 causing piston 126 to move to the right, thereby opening throttle 120 so as to reduce the amount of the pressure drop $\Delta P$ until it returns to the initial value thereof to re-establish the initial ratio of the pressure drop $\Delta P$ to $$P - \left(P_o + \frac{F}{s}\right).$$

Likewise, a decrease in Q will produce an opposite motion in throttle 120 to maintain that fixed ratio of $\Delta P$ to the value:

$$P - \left(P_o + \frac{F}{s}\right).$$

In the system of FIG. 9B the pressure drop $\Delta P$ is equal to the expression:

$$\frac{S-s}{S} P - \left[\frac{F + P_o(S-s)}{S}\right]$$

Likewise, the system functions to maintain a constant ratio between $\Delta P$ and a value equal to:

$$P - \left(P_o + \frac{F}{S-s}\right)$$

regardless of the value of Q. It will be noted that in FIG. 9B the upstream pressure P is communicated via conduit 148 to chamber 146 instead of to chamber 144, and the counter pressure $P_o$ is connected to chamber 144 instead of to chamber 146.

There will now be described more particularly a feature of the invention which is applied in the case where the combustion chamber is supplied with fresh air, through a primary air intake to introduce fresh air into a combustion zone, and through a secondary air intake to introduce fresh air into a mixing zone.

By way of example, this feature may be accomplished by first throttle means which comprise a movable mechanism which houses, on one hand, the second throttle means and, on the other hand, the regulating device for the flow-rate of fuel.

To this end, the movable mechanism of the first throttle means can be constituted by a cylinder bearing on the outside a throttle member cooperating with a fixed seat, the second throttle means being then constituted by one or several ports formed in this cylinder and by a slide valve covering or uncovering this or these ports, this slide valve being actuated by a piston of which one of the faces is subjected to the pressure existing in the downstream or upstream part of the bypass pipe, and the other face to the action of a counter pressure and to the action of a spring, this slide valve or this piston being advantageously connected to the regulating device for the flow-rate of fuel.

In this respect, reference will be made first of all to FIGS. 10 and 11, which show a diesel engine denoted by the reference numeral 201; this engine is supercharged by a turbo-compressor unit denoted by the reference numeral 202.

This turbo-compressor unit 202 comprises a compressor 203 delivering compressed air to supply the engine through a pipe 204, and a turbine 205 driving said compressor 203 by means of a shaft 206, this turbine 205 being actuated by the exhaust gases from the engine 201.

There is provided a bypass pipe 207 permitting direct and permanent passage of fresh air delivered by the compressor 203 to the exhaust gases emerging from the engine.

A combustion chamber 208 is then provided upstream of the turbine 205, this combustion chamber 208 being supplied by the exhaust gases through a pipe 209, and by fresh air taken from the bypass pipe 207. This combustion chamber 208 is in addition supplied with fuel by means of an injector 210 or 210a supplied by a pump 211 or 211a from a reservoir 212.

As regards the supply of this combustion chamber 208 with exhaust gases and with fresh air, recourse is had to an arrangement according to which said combustion chamber is supplied, by a primary air intake 213 to introduce fresh air into a combustion zone 214, by an exhaust gas intake 215 to introduce these exhaust gases into a mixing zone 216 situated downstream of the combustion zone 214, and by a secondary air intake 217 to introduce fresh air at the level of the abovesaid mixing zone 216.

The primary air intake 213 can be constituted by a central pipe 218 arranged coaxially with the combustion chamber 208. The exhaust gas intake 215 can then be constituted by a first annular pipe 219 encircling the central pipe 218. Lastly, the secondary air intake 217 can be constituted by a second annular pipe 220 encircling the first annular pipe 219.

According to the invention, there is provided first throttle means 221 with variable outlet cross section arranged so as to be traversed by the secondary air, these first throttle means 221 generating between the upstream part of the bypass pipe 207 (part connected to the compressor 203) and the downstream part of the bypass pipe 207 (part connected to combustion chamber 208); a pressure differential $\Delta P$ which is an increasing function, preferably linear or substantially linear, of the pressure P existing in the upstream part regardless of the engine speed and, therefore, which is independent of the air flow passing through throttle means 221. A second throttle means 222 is also provided with variable outlet cross section subjected to the pressure difference $\Delta P$ generated by the first throttle means 221 and arranged so as to be traversed by the primary air, these second throttle means 222 offering an outlet cross section to this primary air which is servocoupled to the pressure $P - \Delta P$ existing in the downstream part of the bypass pipe 207, this servocoupling being according to a predetermined law.

Advantageously, these second throttle means 222 control in addition a regulating device for the flow rate of fuel 223 controlling the amount of fuel injected into the combustion chamber 208 so as to preserve, for flow rates of primary air and of fuel, a ratio insuring good stability of combustion, that is to say, a relationship as close as possible to stoechiometric proportions.

It will then be understood that the fresh air taken from the bypass pipe 207 is divided into primary air coming from the primary air intake 213 and the second throttle means 222 to supply the combustion zone 214 of the combustion chamber 208 and into secondary air coming from the secondary air intake 217 and the first throttle means 221 to supply the mixing zone 216 of the combustion chamber 208. The flow rate of air circulating in the bypass pipe 207 varies in a ratio of the order of 1 to 10 according as the engine operates at full speed (combustion chamber turned low) or as the engine operates at idling speed (combustion chamber used to the maximum).

By way of explanation of the aforementioned first and second throttle means associated with such a combustion chamber, it will then be understood that there is established a relationship between the outlet cross section $S_p$ offered to the primary air and the outlet cross section $S_s$ offered to the secondary air. In fact, if $\Delta P$ denotes the pressure difference on each side of the first throttle means 221 and P the pressure existing in the upstream part of the bypass pipe, the increasing linear function connecting $\Delta P$ and P can be written in the following way: $\Delta P = \alpha P + \beta$, $\alpha$ and $\beta$ denoting two coefficients. On the other hand, it can be written that this pressure difference $\Delta P$ is proportional to the specific mass m of fresh air and to the square of its velocity V: $\Delta P = km\, V^2$, K being a constant to a first approximation. From the two above equations, there can then be deducted the value of the velocity V:

$$V = \left(\frac{\alpha P + \beta}{km}\right)^{+1/2}$$

Now the sum of the outlet cross sections $S_p$ and $S_s$ is connected to the total flow rate Q of fresh air in the bypass pipe by the following equation:

$$S_p + S_s = \frac{Q}{mV}$$

with $S_p$ being a function of P, namely $S_p = f(P)$, $f(P)$ being the predetermined relationship between the outlet cross section $S_P$ and the pressure P, namely by replacing the velocity by its value as a function of the pressure:

$$S_p + S_s = Q \left[\frac{m}{k}(\alpha P + \beta)\right]^{-1/2}$$

Under these conditions, the flow rate of primary air $Q_p$ only depends on the pressure P according to the equation:

$$Q_p = f(P) \left[\frac{m}{k}(\alpha P + \beta)\right]^{1/2}$$

As will be evident, the flow rate of secondary air $Q_s$ is always equal to the difference between the total flow rate flowing in the bypass pipe and the flow rate of primary air $Q_p$: $Q_s = Q - Q_p$. On the other hand, the flow rate of fuel which is necessary to insure the operation of the combustion chamber 208 enabling autonomy of the turbocompressor unit 202 on starting of the engine and the flow rate of fuel sufficient to maintain the operation of the combustion chamber 208 turned low are within a ratio of the order of 30 to 1.

Now the stability of combustion in the combustion chamber will be optimal if the flow rate of air insuring the combustion, that is, the flow rate of air coming from the primary air intake, is in the neighborhood of the flow rate corresponding to stoechiometric proportions.

As previously explained, the sum of the outlet cross sections $S_p + S_s$ (respectively offered to the primary and to the secondary air) is hence determined by the values of the delivery pressure P from the compressor and of the flow rate Q of fresh air in the bypass pipe 207. Under these conditions and to organize the flow rates of primary and secondary air, it suffices to act on one of these outlet cross sections, the second being adjusted itself by the difference. Action is therefore on the outlet cross section $S_p$ offered to the primary air.

As regards the predetermined relationship followed by the servocoupling between, on one hand, the outlet cross section $S_p$ offered to the primary air and, on the other hand, the delivery pressure $P - \Delta P$, which exists in the downstream part of the bypass pipe 207, it can be selected to respect the operation of the combustion chamber with the engine - turbo-compressor group as a whole. This law will be considered again in more detail below with respect to the two embodiments of the invention relating, the first, to a supply of the combustion chamber by a return type injector (FIG. 10) and, the other, to supply of the combustion chamber by a nonreturn type injector (FIG. 11).

Figure 10:
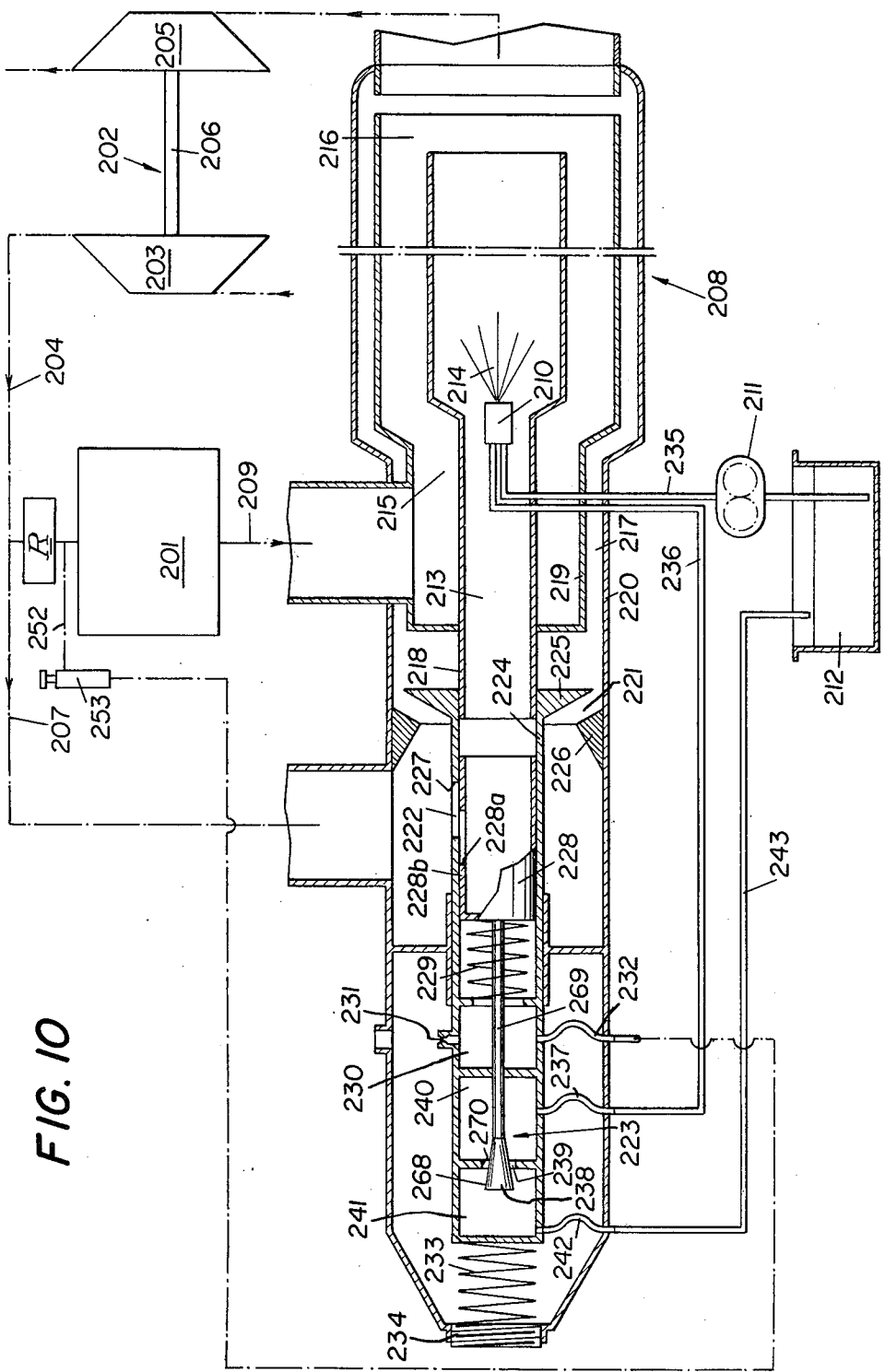
FIG. 10 is a diagrammatic view of a supercharged diesel engine, equipped with a combustion chamber with two fresh air intakes, and constructed according to an embodiment of the invention for which the combustion chamber comprises a return injector.
Figure 11:
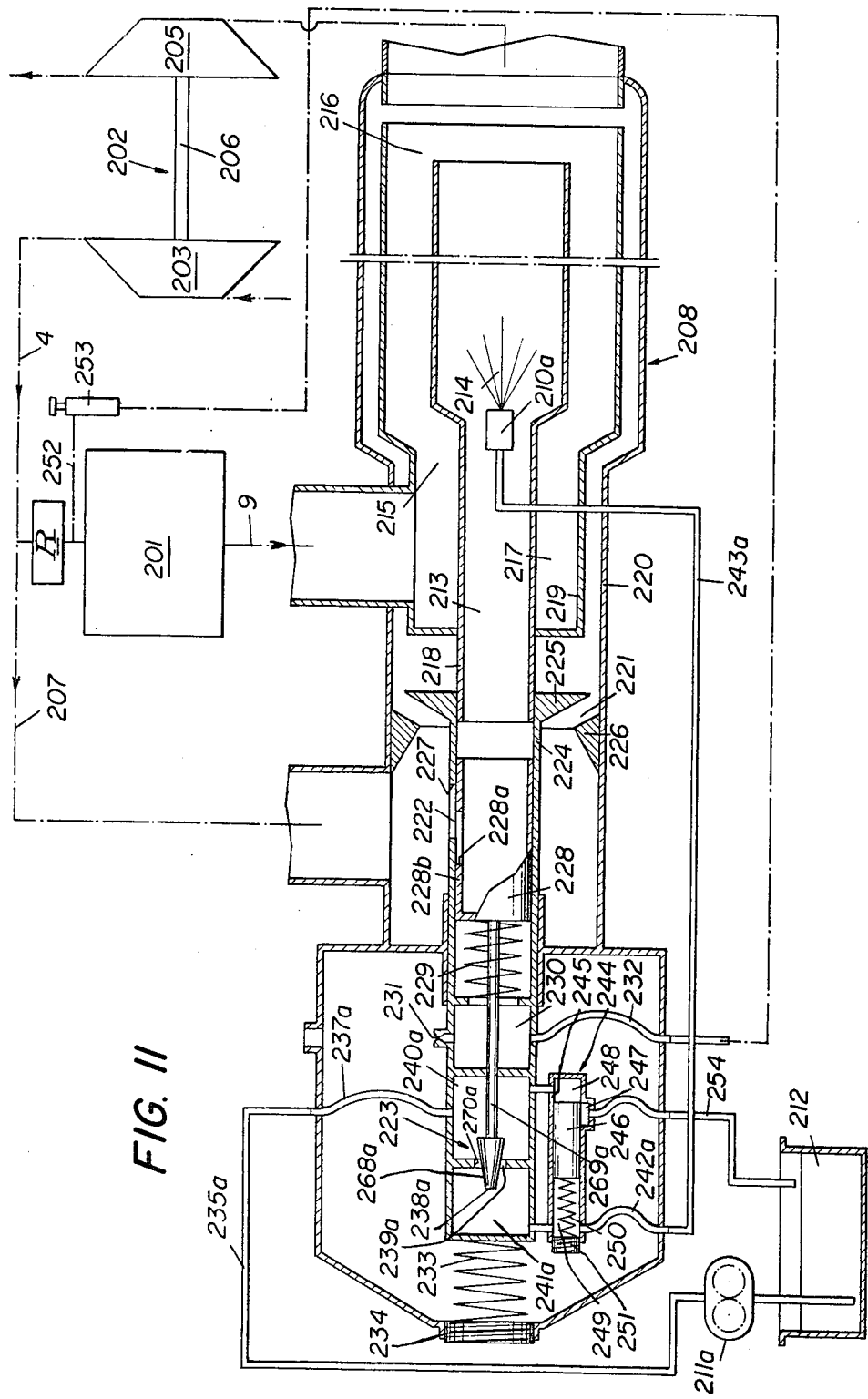
FIG. 11 is a diagrammatic view of a supercharged diesel engine, equipped with a combustion chamber with two fresh air intakes, and constructed according to an embodiment of the invention for which the combustion chamber comprises a "nonreturn" injector.

In a particularly simple embodiment of the invention from the point of view of its construction, and which can provide two forms of the machine, illustrated respectively in FIGS. 10 and 11, the first throttle means 221 comprise a movable mechanism which houses the second throttle means 222 and the regulating device for the flow rate of fuel 223. To this end, the movable mechanism of the first throttle means 221 can be constituted by a cylinder 224 bearing on the outside a throttle member 225 cooperating with a fixed seat 226. Under these conditions, the second throttle means 222 can then be constituted by one or several ports 227 formed in this cylinder 224 and by a slide rod 228 covering or uncovering this or these ports 227, this slide rod 228 forming a piston of which one of its faces is subjected to the pressure of the primary air and the outer face to the action of a counter pressure $P_c$ and to the action of a spring 229, this slide valve 228 being connected to the regulating device for the flow rate of fuel 223. The covering and uncovering of the one or more ports 227 by the slide valve 228 forming a piston can be effected by providing said piston with one or several orifices 228a formed in its skirt 228b.

As regards the counter pressure exerted on this slide valve 228, it can be equal to atmospheric pressure. However, in certain cases, and to shift the area of regulation, a counter pressure $P_c$ may be selected higher than atmospheric pressure. It is then particularly simple to provide a regulating chamber 230 communicating with the surface concerned of the slide valve 228 and communicating also with atmospheric pressure through a throttle orifice 231, this regulating chamber 230 being supplied by air under pressure by means of a flexible pipe 232. This air under pressure escapes permanently from the regulating chamber 230 through throttle orifice 231 and causes in said regulating chamber 230 an excess pressure which then constitutes the counter pressure $P_c$.

To this end, it is particularly advantageous to connect the flexible pipe 232 opening into this regulating chamber 230 to a pipe from the motor installation in which cooled compressed fresh air flows. There can then be arranged between the engine 201 and its intake cooler R a sampling pipe 252 ending at the flexible pipe 232 after having traversed a needle regulating device 253 enabling adjustment of the counter pressure $P_c$ to a value comprised between atmospheric pressure and the delivery pressure P.

A regulating spring 233 is provided to act on the movable mechanism of the first throttle means 221, this spring 233 enabling adjustment of the parameter $\beta$ of the linear function $\Delta P = \alpha P + \beta$ giving the pressure difference generated by the abovesaid first throttle means 221. The action of this adjusting spring 233 can advantageously be adjusted by acting on a movable stop 234 against which said spring 233 is supported. However, the first throttle means 221 can be subjected to vibrations of aerodynamic origin, and it is advantageous to subject the movable mechanism of these first throttle means 221 to the effect of a viscous damping device 263 shown in FIG. 12 in which the same reference numerals denote the same members as in FIG. 10. This viscous damping device 263 can be supplied from a source of viscous fluid 264 under variable pressure. It will be evident from FIG. 12 that the device 263 may consist of a piston having restricted orifice perforations and connected by a rod to cylinder 224, the opposed working surfaces of this piston differing by the cross section of the connecting rod to provide the differential action. Then the pressure of this source of viscous fluid replaces the effect of the spring 233 and its variation replaces the action of the movable stop 234.

As regards the regulating device for the flow rate of fuel 223, recourse may be had, for example, to two embodiments illustrated respectively in FIGS. 10 and 11. For the embodiment illustrated in FIG. 10 corresponds to an injector 210 supplying the combustion chamber 208 of the return type. The pump 211 supplies the injector 210 at constant pressure by means of a supply passage 235 and the surplus of fuel, which is not injected into the combustion chamber, takes a return passage 236 ending, by means of a flexible pipe 237, at the regulating device for the flow rate of fuel 223. This regulating device for the flow rate of fuel 223 may comprise a movable member 238 connected by a stem 269 to the slide valve 228 of the second throttle means 222, the adjustment action being obtained by a variable nozzle 239. This variable nozzle can have a variation of cross section of continuous type (needle more or less engaged in an orifice) or a variation of discontinuous type (covering or uncovering of ports). Preferably, this variable nozzle 239 comprises at least one needle 268 with a conical portion more or less engaged in an orifice 270. The fuel brought in through the flexible pipe 237 occupies an intake chamber 240, then is obliged to pass through the variable nozzle 239 before emerging into a recovery chamber 241, whence it reemerges by means of a flexible pipe 242 to be then sent back to the reservoir 212 through a low pressure passage 243.

Referring to FIG. 10, it is noted that when the pressure which is exerted on the slide valve 228 of the second throttle means 222 increases, the slide valve 228 moves toward the left which has the effect, on one hand, of reducing the outlet cross section of the second throttle means 222 and through this fact reducing the flow rate of primary air and, on the other hand, of displacing the movable member 238 with needle 268 of the device for regulating the flow rate of fuel 223 toward the left and of increasing the outlet cross section of the variable nozzle 239, hence of increasing the flow rate of fuel circulating in the return passage 236, and hence of reducing the flow rate of fuel injected into the combustion chamber 208. Of course, when the pressure which is exerted on the slide valve 228 diminishes, the reverse phenomena are produced.

In FIG. 11, the same reference numerals denote the same members as in FIG. 10, but the combustion chamber 208 is supplied with fuel by means of an injector 210a which is of the nonreturn type. This injector 210a is supplied by a pump 211a from the reservoir 212 through the regulating device for the flow rate of fuel 223 and a supply channel 235a. This regulating device for the flow rate of fuel 223 can comprise a movable member 238a connected by a rod 269a to the slide valve 228 of the second throttle means 222, the adjustment action being obtained by a variable nozzle 239a. This variable adjustment can present a continuous variation of cross section (needle more or less engaged in an orifice) or a discontinuous variation of the cross section (covering or uncovering of ports). Preferably, this variable nozzle 239a comprises at least one needle 268a with a conical part more or less engaged in an orifice 270a.

The fuel brought in through a flexible pipe 237a occupies an intake chamber 240a, then is obliged to pass through the variable nozzle 239a before emerging into a recovery chamber 241a whence it emerges by means of a flexible pipe 242a to be then directed toward the injector 210a through a high pressure passage 243a.

To maintain a constant pressure difference on each side of the variable nozzle 239a, recourse is had to a slide valve regulator 244. This slide valve regulator 244 is constituted by a cylinder 245 in which a free piston 246 slides covering or uncovering a port 247 formed in the wall of this cylinder 245. This free piston hence defines, on one hand, a chamber 248 situated on the side of the port 247 and placed in communication with the intake chamber 240a of the regulating device for the flow rate of fuel 223 and, on the other hand, a chamber 249 situated opposite the port 247 and placed in communication with the recovery chamber 241a of the regulating device for the flow rate of fuel 223. This free piston 246 is hence subjected to the difference in pressure existing between the intake chamber 240a and the recovery chamber 241a and to the action of a spring 250 acting contrary to this difference in pressure. The port 247 communicates with a discharge pipe 254 which ends at the fuel reservoir 212.

Referring to FIG. 11, it is noted that when the pressure which is exerted on the slide valve 228 of the second throttle means 222 increases, this slide valve 228 moves toward the left, which has the effect, on one hand, of reducing the outlet cross section of the second throttle means 222 and through this fact reducing the flow rate of primary air and, on the other hand, of moving the movable membwe 238a with the needle 268a of the regulating device for the flow rate of fuel 223 toward the left and of reducing the outlet cross section of the variable nozzle 239a, hence of reducing the flow rate of fuel directed to the injector 210a through the supply passage 235a. Of course, when the pressure which is exerted on the slide valve 228 diminishes, the reverse phenomena are produced.

As for the slide valve regulator 244, its operation is such that the free piston 246 more or less closes the port 247. The movement of the free piston 246 remaining very slight, the force exerted by the spring 250 on the said free piston 246 is practically constant; and through this fact, the pressure difference between the intake chamber 240a and the recovery chamber 241a is substantially constant whatever the pressure existing in the combustion chamber 208 and whatever the flow rate of fuel injected. The value of this pressure difference is adjusted by the biasing alone of the spring 250 for which it is possible to provide a movable stop 251 against which said spring 250 is supported. It is then understood that the flow rate of fuel through the variable nozzle 239a depends only on the outlet cross section, and hence depends only on the supercharging pressure through the position of the piston 228 of the second throttle means 222.

Figure 12:
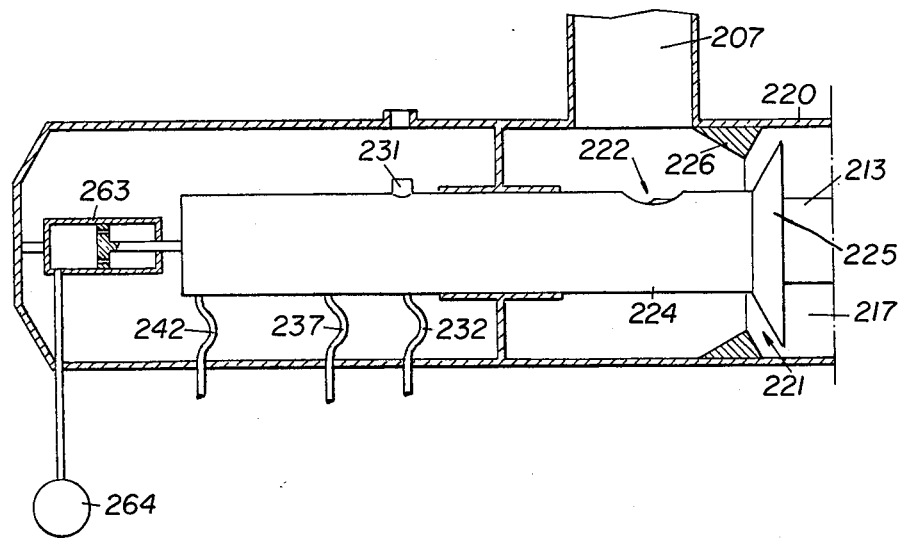
FIG. 12 is a parallel view of an important element of the engine of FIG. 10 showing a modification of the invention.

When recourse is had to one or other of the two embodiments of the invention illustrated in FIGS. 10 and 12 or in FIG. 11, by acting on the geometry of the second throttle means 222 and on the law of the spring 229 acting on the slide valve 228 of these second throttle means 222, it is possible to select the servocoupling law between the outlet cross section $S_p$ and the downstream pressure $P - \Delta P$, or the difference between this downstream pressure $P - \Delta P$ and the counter pressure $P_c$ existing in the regulation chamber 230. To each value of the outlet cross section $S_p$ corresponds a value of the flow rate of primary air $Q_p$, hence a value of the flow rate of fuel Q to be introduced into the combustion chamber, this flow rate of fuel being insured by the geometry of the variable nozzle.

Figure 13:
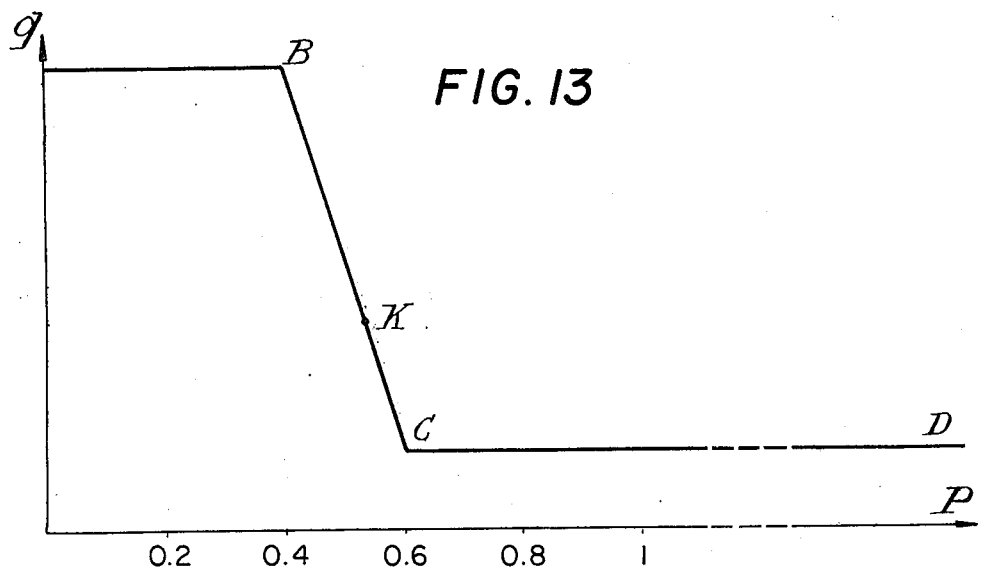
FIG. 13 is a graph relating to the operation of an engine according to the invention.

Taking into account the operation of the engine, the desired objective is to regulate the flow rate of fuel Q to prevent, within the limits of possibility of the combustion chamber, the supercharging pressure from decending below a preset threshold; to enable starting up of the turbo-compressor unit prior to the engine; and to enable a turned down operation of the chamber lending itself to rapid resumption of full power without risk of extinction. Under these conditions, it is desirable to adopt a relationship for the flow rate of fuel Q to be introduced into the combustion chamber as a function of the downstream pressure $P - \Delta P$ or of the difference between this downstream pressure $P - \Delta P$ and the counter $P_c$ existing in the regulation chamber 230, such as the relationship illustrated by way of example in the graph of FIG. 13 in which there is shown as abscissae the supercharging pressure P (relative pressure expressed in bars) and as ordinates the flow rate of fuel Q introduced into the combustion chamber.

In the absence of counter pressure (the pressure in the regulation chamber 230 being equal to the atmospheric pressure), the point of operation of the combustion chamber is moved according to this graph. If this point of operation is stabilized at point K (idling of the engine), it will descend toward the point C when the load on the engine increases up to about 20 percent of the maximum load and beyond the point of operation is moved between C and D (combustion chamber turned low).

This simple pneumatic displacement of the regulating range can be used advantageously to obtain an increase in torque at low speed. It is also possible to profit from the displacement of the regulating zone to accelerate the rise in temperature of the engine (the engine being at idling speed when the combustion chamber is at full power, thermal exchange means being provided between the hot air emerging from the compressor and the cooling fluid for the engine).

In addition, the introduction of counter presssure which can reach the supercharging pressure enables the production, by the displacement of the regulating zone, of an altimetric compensation. In fact, when atmospheric pressure diminishes, there can be given to the counter pressure a value equal to the supercharging pressure which has the effect of opening the second throttle means completely and of supplying the combustion chamber at full power (flow rate of primary air and flow rate of fuel reaching their maximum values).

There can hence, due to the invention, be controlled at the same time the flow rate of fuel injected into the combustion chamber 208 and the flow rate of primary air by acting on the geometry of the second throttle means 222 (port 227 and orifice 228a) and on the biasing (and if necessary the adjustment) of the springs 229 and 250. There is thus insured an air-fuel in the combustion zone 214 in proportions sufficiently close to stoechiometric proportions to obtain, at all operational speeds of the engine, good stability of the combustion chamber 208.

From the foregoing description it will now be understood that the embodiments described in conjunction with FIGS. 1–8 involve a supercharged engine with a low compression ratio (VR<12) comprising a bypass permanently fully open, dimensioned so as to permit the whole of the flow-rate volume delivered by the compressor to pass without appreciable pressure drop.

This feature will be evident from the previous description due to the fact that the turbocompressor operates when the engine is stopped, and that hence the whole of the flow-rate of the compressor passes through the bypass pipe. This permanently fully open pipe renders the permeability of the flow path downstream of the compressor independent of the rotary speed of the engine. This property therefore permits the operation in stable manner, of the compressor very close to its pumping or surge line, and therefore in a zone of high yield. Through this fact it is possible to reach very high supercharging pressures, taking into account the energy available at the engine exhaust. This ability, associated with the very low compression ratio enables the power of the engine to be considerably increased. However, this widely open pipe prevents any scavenging of the engine.

Accordingly, for engines where scavenging is indispensible (as in two-stroke engines, or in large bore four-stroke engines due to the heat retention of the valves) the embodiments of FIGS. 9–13 have been provided pursuant to the invention to create a pressure-drop-generating member arranged in the bypass pipe while, however, preserving the essential property, described above, of the widely open pipe, that is to permit the highly efficient operation of the compressor near its surge line.

It has been found that this could be achieved by generating a pressure drop which is independent of the flow-rate passing through the bypass pipe and hence a pressure drop which does not depend directly on the rotary speed of the engine. For a given supercharging pressure, the flow-rate of the compressor is given (taking into account this pressure drop) and the distribution of the flow-rate between the engine and the bypass pipe is organized as a function of the rotary speed of the engine. Therefore, the reduction in this speed does not risk involving pumping of the compressor.

It also has been found that, taking into account the desirability of operating near the surge line, this pressure drop decreases when the supercharging pressure diminishes and conversely.

In order that the turbine can be driven by the exhaust gases from the engine it is necessary that the relationship between the expansion ratio $\overline{W}_E$ of the turbine and the compression ratio $\overline{W}_c$ of the compressor should remain substantially constant:

$$\frac{\overline{W}_t}{\overline{W}_c} = \frac{(P - \Delta P)/P_o}{P/P_o} = 1 - \frac{\Delta P}{P}$$

The regulating valve members described in conjunction with FIGS. 9–13 satisfy these two requirements. It also will be understood by those skilled in the art from the foregoing description that a scavenging pressure difference may be created by other control devices following the principles taught herein, e.g., a movable throttle valve operable under the control, via suitable balancing and proportioning linkage, of flow sensing and pressure sensing bellows mechanisms to achieve a pressure drop in the bypass 106 which, while an increasing function of only the pressure existing in the upstream portion of the bypass 106, is nevertheless independent of the air flow rate through bypass 106.

On the other hand, in the embodiment described in conjunction with FIGS. 9–13 with adjustable pressure loss, the above functions are ensured essentially by the construction of the throttle means 108 itself and in a very simple manner, i.e., the throttle means 108 are constituted by a movable valve 108a or 225 cooperating with the fixed seat 108e or 226. This type of means is directly sensitive to the difference in static pressure generated by the throttle means itself, whilst a flat type butterfly valve, a turn-clock type valve, etc., are not directly sensitive to such differences in static pressure. The fact alone of associating a movable valve with an equilibrating piston working under the effect of the pressure insures the desired function, viz: the independence of the flow-rate and the dependence of only the pressure according to an increasing function is ensured structurally:

$$\Delta P = \frac{s}{S} P - \frac{F + P_o s}{S}$$

$s$: cross-section of the equilibrating piston
$S$: cross-section of the valve
$P_o$: atmospheric pressure or suitable counter pressure
$F$: stiffness of the return spring Thus, as in the case of the wide open bypass without any regulating valve shown in FIGS. 1–18, the always open but regulated bypass 106 insures the independence of the pressure drop generated from the flow-rate in the bypass pipe, and hence independence from the rotary speed of the engine thereby enabling stable adaptation of the compressor very close to its pumping line. This adaptation thus enables very high supercharging levels to be reached (five and over) with only the energy available at the engine exhaust (without a combustion chamber), taking into account temperatures commonly experienced at the engine exhaust (550° C to 650° C).

From the foregoing description, it will now be apparent that the invention is in no way limited to those of its methods of application, nor to those of its method of production of its various parts, which have been more especially indicated; it encompasses, on the contrary, all variations. However, by way of further illustration and not by way of limitations, an actual working embodiment incorporating the present invention, along with its operational and performance characteristics and a comparison to the prior art, will now be described and illustrated in conjunction with FIGS. 14–17.

Figure 14:
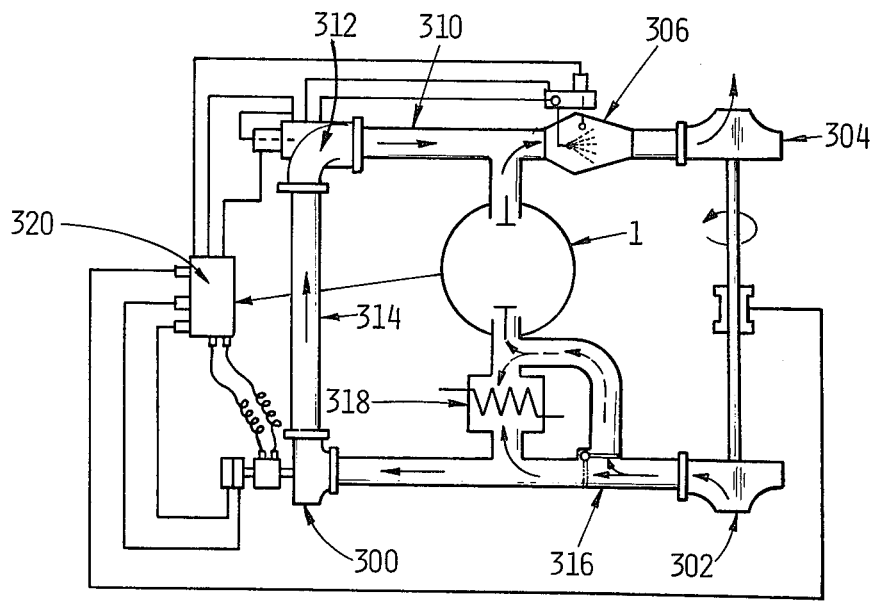
FIG. 14 is a schematic diagram of a commercial Poyaud Model 520-6L engine modified in accordance with the present invention.
Figure 15:
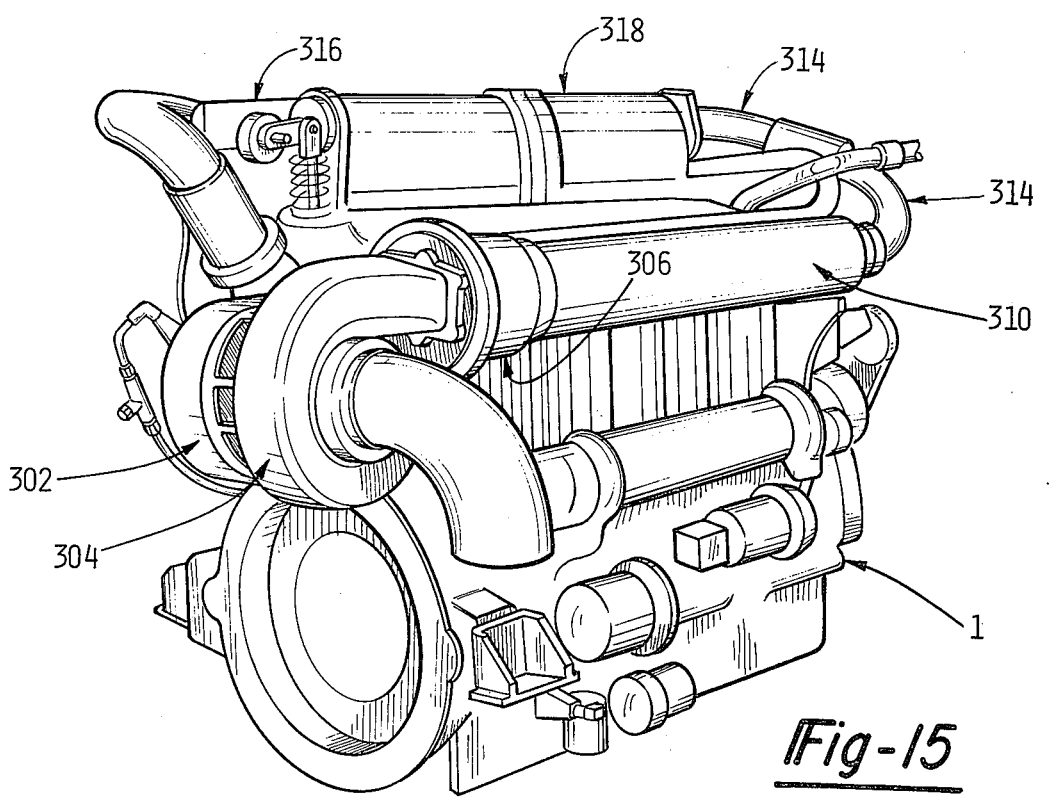
FIG. 15 is a rear perspective elevational view of a commercial Poyaud Model 520-6L engine also modified in accordance with the present invention and in particular utilizing the system shown in FIG. 2.
Figure 16:
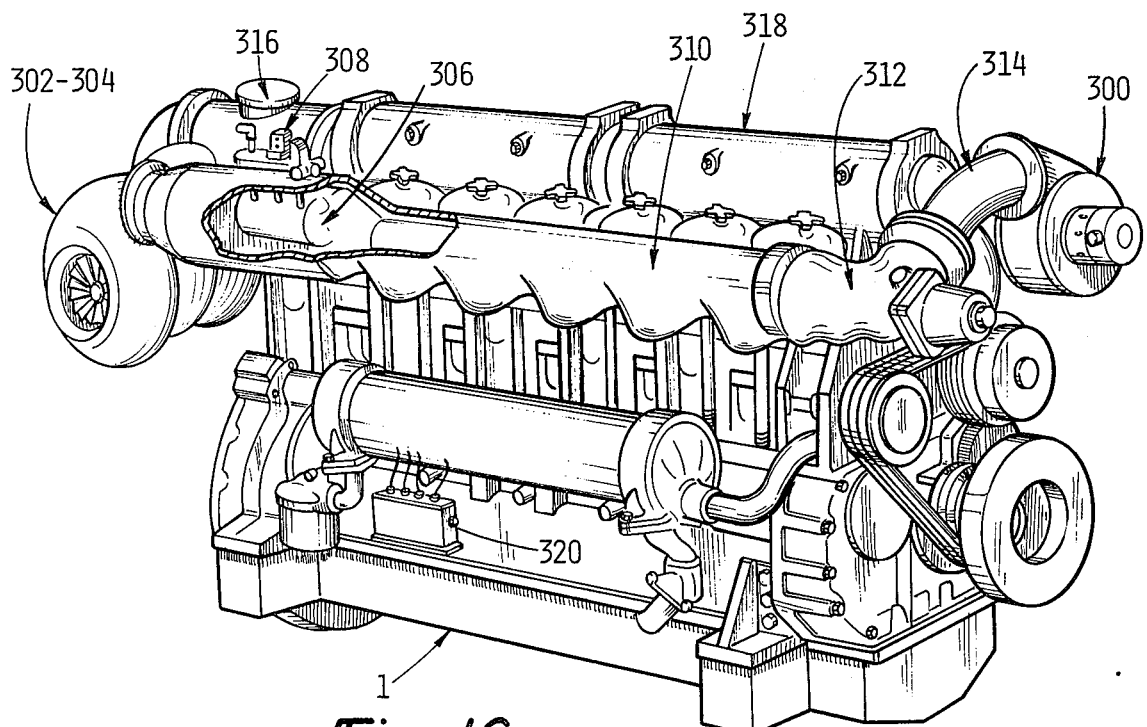
FIG. 16 is a front perspective elevational view of the commercial Poyaud Model 520-6L engine incorporating the systems described in conjunction with FIGS. 11–14.

FIG. 14 is a schematic diagram of the engine and supercharging system shown in FIGS. 15 and 16 and incorporates elements of the systems shown and described in conjunction with FIGS. 9–14 as well as certain additional features which are the subject of my copending applications Ser. No. 345,966, filed March 29, 1973 (French patent application 72/12112, filed Apr. 6, 1972), Ser. No. 263,759 filed June 7, 1972 (French patent application 71/26283 filed July 19, 1971), and Ser. No. 436,728 filed Jan. 25, 1974 (French patent application 73/06202, filed Feb. 22, 1973). In practicing the method of supercharging of the invention as described previously, a conventional commercially available diesel engine 1, specifically the Poyaud Model 520-6LS3 engine manufactured by Societe Surgerienne de Construction Mecaniques of Surgeres, France, was modified to contain or be equipped with the following elements: a starting unit 300 corresponding to unit 6 described previously, a compressor 302 and turbine 304 together forming a turbo-compressor unit similar to unit 2-4-5 described previously, a combustion chamber 306 corresponding to chamber 3 or 208, a fuel injection unit 308 similar to unit 7 or units 210 or 210a and associated systems of FIGS. 10 and 11 respectively, an exhaust manifold 310 corresponding to manifold 1b, a bypass regulator 312 of the type shown in FIGS. 9, 10 or 11, a bypass pipe 314 arranged as shown in FIGS. 2 or 9, an adjustable preheating valve 316, an air cooler 318 arranged as disclosed in my copending application Ser. No. 263,759, and a suitable control unit 320 for correlating the functions of starter 300, regulator 312 and injection unit 308 in accordance with the previously described method of the invention. The manner in which the aforementioned elements are structurally incorporated with the aforementioned Poyand Model 520-6LS3 engine is shown in FIGS. 15 and 16 wherein like reference numerals denote the corresponding elements.

The starting unit 300 insures the starting and lubrication of the turbo-compressor 302–304 and the supply of fuel to the combustion chamber 306. This unit ceases to operate once the engine has started under its own power whereupon the functions of lubrication and fuel supply as required to the combustion chamber 306 are assumed by the engine oiling system and an engine driven fuel pump. The combustion chamber 306 contains the injection unit 308 and is mounted in the exhaust manifold 310 which in turn is suitably adapted to the requirements of a given engine as will be understood by those skilled in the art from the foregoing description. The combustion chamber 306 constitutes the thermodynamic heart of the hybrid machine formed by the invention and organizes the mixture of the exhaust gases leaving the engine 1 and the bypassed air from conduit 314. The regulator 312 is flanged to the upstream end of the exhaust manifold 310 and performs the following functions: (a) control of the pressure loss or pressure drop in bypass 314 and hence the scavenging ratio; (b) proportioning of the air flow to the combustion chamber 306; (c) proportioning of the fuel flow to the combustion chamber 306; (d) regulation of the turbine 304 to a pressure level displayed on a control board associated with control 320 for economy or extra torque or speed modes of operation; and (e) altimetric correction. The preheating valve 316 bypasses the air cooler 318 during heating of the cooling water preparatory to start up, and the control unit 320 centralizes all of the functional commands with suitable safety factors providing a system of high reliability.

The Poyaud engine equipped as described above is operated with no more difficulty than a convenional diesel engine, the preliminary starting up of the compressor 302 being completely automatic. The engine may then be started independently of the ambient temperature conditions and the time required for heating up the cooling water is much reduced, the cooler 318 for the supercharging air initially operating as a water heater. Moreover, the operator has available the control 320 which enables him to obtain extra torque instantaneously from the engine whenever such is needed. This enables considerable reduction in the number of gear box ratios and in practice may be operated somewhat like the conventional overdrive which it replaces. The permanent existence of an excess of air being fed to the engine and chamber 306 avoids any fouling of the engine combustion chambers as well as of the distributor of the turbine 304.

Figure 17:
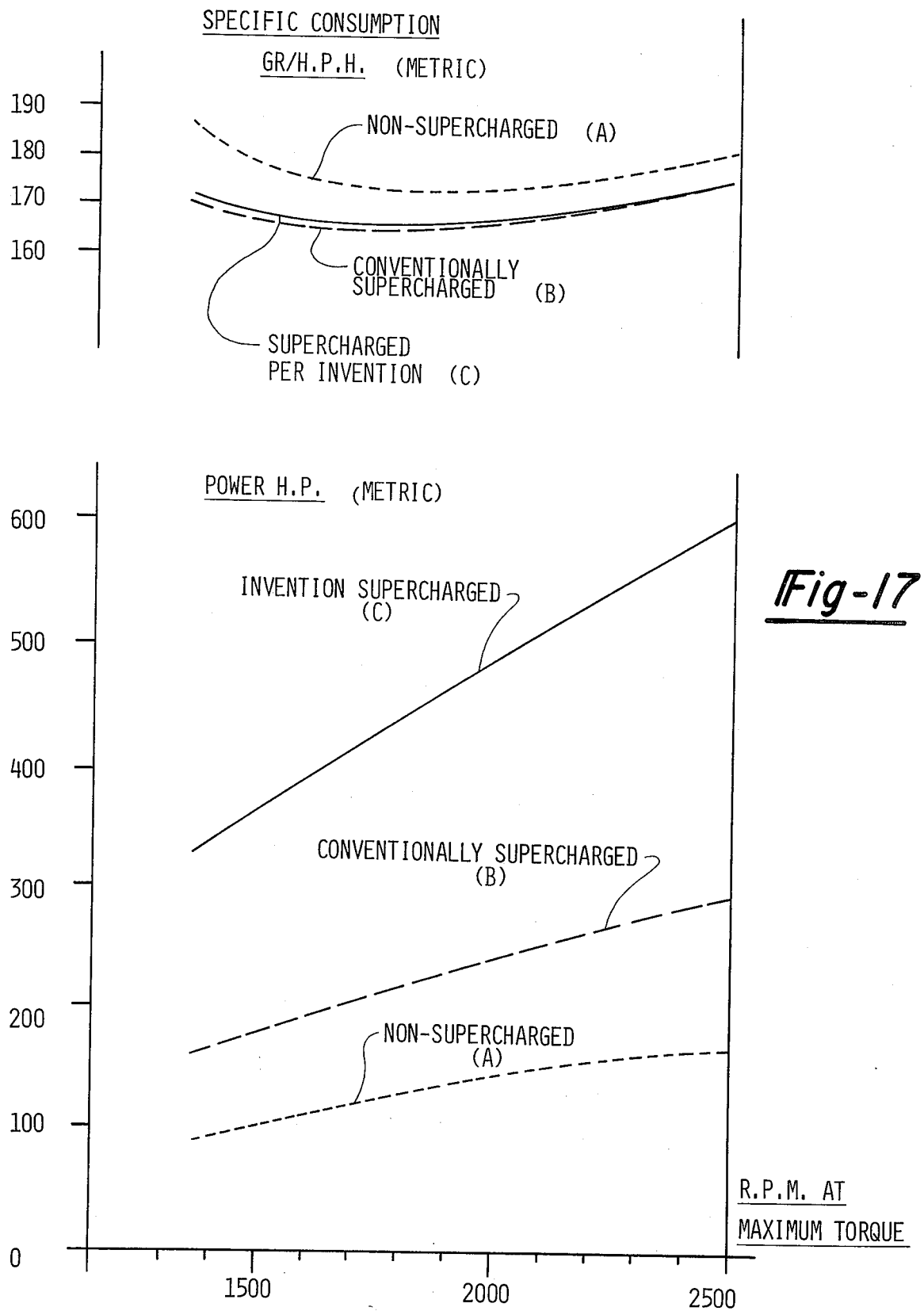
FIG. 17 is a graph showing a plot of engine r.p.m. against horsepower and against specific fuel consumption for nonsupercharged, conventionally supercharged and invention supercharged versions of the engine shown in FIGS. 14–16.

Referring more particularly to the engine shown in FIG. 15, which illustrates the first application of the invention to a commercially available engine, and to the test results shown in FIG. 17 which is a plot of engine rpm against horsepower (lower graph) and against specific fuel consumption in grams per horsepower hour (upper graph), it will be seen how the horsepower of this engine was increased when it was modified according to the present invention, as demonstrated by comparative tests carried out on a conventional production line diesel engine (A) unsupercharged, (B) supercharged conventionally and (C) modified according to the present invention.

The Poyaud 520-6LS3 engine develops 180 hp at 2500 rpm in its nonsupercharged version (A), and 300 hp at 2500 rpm in its convenionally supercharged version (B) with cooling of the supercharging air.

The adaptation of the engine with the supercharged system of the invention (C) enables this power to be brought to 600 hp in continuous service.

This adaptation is effected on a production line engine by means of the following modifications:

1. Pistons - The combustion chamber of the pistons of the production line engine is remachined so as to reduce its volumetric ratio from 15 to 8.55.

2. Injection pump - The diameters of the pistons of the injection pump were brought from 90 to 130 mm so as to be able to double the amount of fuel injected.

3. Replacement of the conventional turbo-blower having a 2.4 pressure ratio by a turbo-blower 302–304 with a pressure ratio of 4.8 and including self-starting means.

4. Replacement of the production line intake manifold, which has one air cooler, with a manifold comprising two air coolers 318 with the same characteristics.

5. Replacement of the production line exhaust manifold by a special exhaust manifold 310 including the combustion chamber 306.

6. A bypass pipe 134 (3.5 inches diameter) connects the intake manifold directly to the exhaust manifold.

7. A pipe normally closed by a butterfly valve 316 and enabling the bypass of the coolers for the supercharging air and brought into action during the phase of starting up and of increasing temperature of the engine.

8. An auxiliary unit 300 enabling self-sustaining operation (especially when the engine has stopped) of the supercharging turbocompressor. This assembly includes especially: (a) an electropump for oil enabling lubrication of the turbocompressor before the starting of the engine; (b) an electropump for fuel supplying the combustion chamber; (c) devices enabling the starting of the turbocompressor and the ignition of the combustion chamber.

9. A fuel regulator 308 for the combustion chamber. This regulator is servocoupled to the supercharging pressure. Its principal function is to prevent the supercharging pressure from falling below a threshold level which is a given value based upon the valve of the volumetric ratio (1.8 bar for a volumetric ratio 8.55) as well as the other parameters involved in establishing self-ignition conditions in the engine.

This adaptation is produced on a production line engine without modification of the main parts of the engine (lower engine, crankshaft, linkage, engine block, cylinder heads, and distributor, oil pumps, auxiliary members and cooling systems for water and oil).

The 600 hp power (curve C) is obtained with the same maximum combustion pressure, and exhaust temperature as in the conventionally supercharged engine (B) operating at 300 hp (135 bar - 600° C).

The specific consumption at maximum power is practically unchanged - (compare the Table of performances and curves A, B and C of the upper graph of FIG. 17). On the other hand, the consumption at low speed is slightly greater than that of the production line engine. When operating engine C at over about 20 percent of its maximum power, the combustion chamber 306 operates at pilot level and its fuel consumption is negligible. Below about 20 percent of the maximum power, the fuel flow increases and the consumption of the combustion chamber is added to that of the engine. This data is shown in the following table and also on the graph of FIG. 17 which shows power and specific fuel consumption as a function of engine speed (at maximum torque).

| | Technical Characteristics | | |
|---|---|---|---|
| | Production line engine | | Invention |
| | Nonsupercharged (A) | Supercharged (B) | Version (C) |
| Cylinder stroke volume | 10.47 liter | 10.47 | 10.47 |
| Weight | 970 kg | 1040 | 1075 |
| Volumetric ratio | 15 | 15 | 8.55 |

| Technical Characteristics | | | |
|---|---|---|---|
| | Production line engine | | Invention Version (C) |
| | Nonsupercharged (A) | Supercharged (B) | |
| Supercharging pressure | 1 bar | 2.4 | 4.8 |
| Maximum pressure | — | 135 bar | 135 |
| Mean effective pressure at 2500 rpm | 6 bar | 10 | 21 |
| Power at continuous speed of 2500 rpm | 180 hp (metric) | 300 | 600 |
| Specific consumption of fuel at maximum power | 182g/hp/h | 175 | 175 |
| Specific flow rate of air at maximum power | 4.5kg/hp/h | 5.2 | 6.2 |
| Temperature at the outlet of the cylinder head at maximum power | — | 580° C | 600° C |

With respect to the anti-pollution aspects of the present invention, it should first be noted that the principal pollutants emitted by an internal combustion engine are:

NO, $NO_x$: oxides of nitrogen
CO: carbon monoxide
$C_x H_y$: unburnt hydrocarbons In a lean mixture, the unburnt hydrocarbons are very low, even negligible.

Numerous measurements (see Wimmer, D.B., and McReynolds, L.A., "Nitrogen Oxides and Engine Combustion", Paper 380E, SAE Summer Meeting, St. Louis, Missouri, June 1961; Alperstein and Bradow, "Exhaust Emissions Related to Engine Combustion Reactions", SAE Transactions, Vol. 75 Paper 660781, 1967; and Huls, T.A., and Nickol, H.A., "Influence of Engine Variables on Exhaust Oxides of Nitrogen Concentrations from a MultiCylinder Engine", SAE Paper 670482, May 1967) indicate that the concentrations of the pollutant species (principally NO and CO) correspond in practice to equilibrium concentrations calculated at the point of maximum temperature and not to those calculated at the temperature of the exhaust. This is explained by the unbalanced behaviour of these pollutant species during combustion and expansion. During combustion, NO and CO are formed very rapidly and reach equilibrium levels at the temperature at which combustion occurs. During expansion, the pollutant species are decomposed very slowly. Thus the formation of nitric oxide and of carbon monoxide is fixed in practice by the maximum temperature of the cycle.

The rates of formation $K_f$ and of decomposition $K_d$ of these species are in the ratio of the equilibrium constant $K_c$ of the reaction considered as follows:

$$\frac{K_f}{K_d} = K_c << 1$$

The interpretation of the phenomenon of freezing at the maximum temperature of the cycle has been given by numerous researchers (see Newhall, H. K., and Starkman, E. S., "Direct Spectroscopic Determination of Nitric Oxide in Reciprocating Engine Cylinders", Paper 670122, SAE Automative Meeting, Detroit, Mich., Jan. 1967; Newhall, W. K., "Kinetics of Engine-Generated Nitrogen Oxides and Carbon Monoxide", Twelfth Symposium [International] on Combustion, The Combustion Institute, 1969; Eyzat, P., and Guibet, J. C., "A New Look at Nitrogen Oxides Formation in Internal Combustion Engines", SAE Paper 680124, Jan. 1968; Lavoie, G. A, Heywood, J. B., and Keck, J. C., "Experimental and Theoretical Study of Nitric Oxide Formation in Internal Combustion Engines", Combustion Science and Technology, Vol. 1, Feb. 1970; and Spadaccini, L. J., and Chinitz W., "An Investigation of Non-Equilibrium Effects in an Internal Combustion Engine", Trans. of ASME, April 1972, pp. 98–107).

Cycles at low compression ratio and high supercharging rate are cold cycles. Thus comparing the maximum temperature of the cycle calculated for the two following different cycles, for example:

| | | |
|---|---|---|
| Compression ratio | 13.1 | 7 |
| Supercharging pressure | 2.75 bar | 7 bar |
| Intake temperature | 65° C | 65° C |
| Temperature at exhaust outlet | 1000° C | 1000° C |
| Maximum pressure of cycle | 140 bar | 140 bar |
| Maximum temperature of cycle | 2400° K | 1780° K |
| Effective average pressure | 16 bar | 32 bar |

Hence reduction of the compression ratio and relative increase in the supercharging rate reduce the maximum temperature of a cycle by more than 600° C. The formation of $NO_x$ and CO would thereby be expected to be considerably reduced.

Actual tests were conducted on an assembly according to the present invention using an engine modified pursuant to the invention as described above. The results were as follows:

| Measurement of Exhaust Emission of Engine (C) | | | |
|---|---|---|---|
| | $NO_2$ (g/hph) | CO (g/hph) | HC |
| 1°) At 2500 revs/min | | | |
| 300 hp | 7.2 | 0.8 | < 1 |
| 425 hp | 6.3 | 1.8 | < 1 |
| 600 hp | 6.6 | 4.3 | < 1 |
| 2°) At idling speed of engine (combustion chamber at maximum rate) | | | |
| As percentage of discharge of dry exhaust | | | |
| CO : 0.16% | | | |
| $NO_2$ : not measurable | | | |

The 520 engine (C) is a direct injection engine (combustion chamber located in the piston).

It will be seen that the level of pollutants from engine (C) is less than half that shown for a direct injection engine, namely about 14 ghph, in FIG. 3 of the study by C. J. Walder published in Ingenieurs de l'Automobile 7/8-72, p. 407; "Moteur et Carburants".

The improved results obtained from the foregoing example of a Poyaud engine supercharged in accordance with the principles of the present invention are believed to be primarily due to several features which cooperate in the combination of the method and system of the invention to provide the substantial increase in power-to-weight ratio without a significant increase in specific fuel consumption as well as the many other advantages indicated previously as well as hereinafter.

Although all of the theoretical bases for the improved results may not as yet be fully understood, it is believed that a discussion of some of the theoretical aspects of the invention may be helpful in providing a better understanding of why such results are achieved and of how the invention may be best applied to other and more diverse engine systems.

As indicated previously, as a first approximation, it should be recognized that the power of a diesel engine is proportional to the flow of air passing through it. The intake volume being limited by the linear speed of the pistons, it is necessary to increase the density of the intake air; i.e., to increase the pressure and decrease the temperature of the air up to the limits stipulated by chemical kinetics and the engine structure. These factors have led engine makers to equip engines with compressors and air coolers for the intake air. In one type of prior art supercharging system the compressors are connected to the engine crankshaft. However, this solution cannot be used in the case of a highly supercharged engine where the compression power may reach and exceed the power of the supercharged engine. Consequently, the present invention is concerned primarily with improvements in another type of prior art system, namely, turbo-supercharging systems wherein turbocompressors are powered by exhaust gases.

Turbo-supercharging first appeared before the Second World War and was adopted on a large scale only after 1950. The first turboblowers had pressure ratios too low to make an appreciable change in the thermodynamic cycle of engines, the structure of the engine remaining unchanged. For a considerable time, supercharged engines were naturally aspirating engines equipped with a pressure booster, considered to be an optional accessory. The gradual increase in pressure ratio was the cause of difficulties which brought considerable discredit on supercharging, which is still synonymous with fragility in certain circles. Subsequently, engines were designed to withstand supercharging, and until recent years the technologies of engines and of blowers have evolved in parallel. More recently, the progress made in centrifugal and axial compressors have provided increases in air pressures which conventional engines have been incapable of utilizing. Therefore, to achieve further progress, the hybrid assembly formed by the engine, the turboblower and the cooling system must be re-evaluated. Accordingly, consideration will first be given to the problems raised by supercharging of engines and their consequences. With respect to the effect of supercharging on mechanical stresses, it first should be noted that a diesel engine is dimensioned for the maximum stresses it will withstand in the region of the combustion dead center; i.e., during a very small fraction of its cycle. Let $P_o(\alpha)$ be the development of pressure as a function of crank angle of the nonsupercharged cylinder. Let $\pi$ be the supercharging ratio = ratio of intake pressure of the supercharged cylinder to that of the nonsupercharged cylinder. The compression phase of the supercharged engine is in accordance with the equation:

$$P_1(\alpha) = P_o(\alpha)$$

The supercharging rate of a given engine is obviously limited to:

$$\pi \max = \frac{P \max}{P_o \text{ comp}} = \frac{\text{Maximum pressure the cylinder can withstand}}{\text{Compression pressure of the nonsupercharged cylinder}}$$

$\pi$ max is about 4 for large bores. If we wish to respect P max and increase $\pi$ max, $P_o$ comp., i.e., the compression ratio of the engine, must be reduced. Thus, an initial result can be established; i.e., the supercharging rate can be increased without changing mechanical stresses by decreasing the volumetric ratio $\epsilon$, as will be seen by the comparative curves shown in FIG. 18.

With respect to the effect of supercharging on the thermal load, it should first be noted that the thermal load is measured by the temperature of the piston wall, at the top of the lining and at the bottom of the cylinder-head. It can be shown that these temperatures increase linearly with the thermal flow passing through the metal at a given point. Mathematical expression of this thermal flow is very complicated, and therefore it is believed for present purposes sufficient to merely reason by comparison between more or less supercharged cylinders.

Let $T_o(\alpha)$ be the development of temperature as a function of the crank-angle of the nonsupercharged cylinder and $\theta$ the ratio of absolute intake temperatures of supercharged and nonsupercharged cylinders. The compression phase of the supercharged cylinder is given by:

$$T_1(\alpha) = \theta T_o(\alpha)$$

As in the case of pressure, it is observed that the temperature at the end of compression is multiplied by $\theta$. This temperature is important because it fixes initiation level of combustion. It is difficult to reduce $\theta$ below 1.25 without a considerable increase in the volume of coolers (the cold source being the atmosphere). $T_o$ comp. must therefore be reduced and this is a second reason for reducing the volumetric ratio $\epsilon$. To provide a practical illustration, the temperatures at the top of the lining of the same cylinder may be theoretically compared in the:

a. conventional supercharging $\pi = 3$, volumetric ratio 12 b. invention supercharging $\pi = 6$, volumetric ratio 7 with excess air giving the same temperature at the end of expansion as at (a).

|  | Conventional | Invention |
| --- | --- | --- |
| Volumetric ratio | 12 | 7 |
| Intake pressure | 3 | 6 |
| Intake temperature | 65° C | 80° C |
| Compression pressure | 90 bar | 85 bar |
| Compression temperature | 577° C | 452° C |
| Combustion pressure | 135 bar | 135 bar |
| Combustion temperature | 1627° C | 1427° C |
| Pressure at the end of expansion | 10,5 bar | 20 bar |
| Temperature at the end of expansion | 900° C | 900° C |

To compare the temperature $T_p$ of the wall at the top of the lining of these two cylinders, the density of the heat flow density $\phi$ passing through the lining at this point is calculated. We know that during the time $d\alpha$, the transfer per unit area E at the point concerned, is given by the equation:

$$dE = \Phi(\alpha)\, d\alpha = h(\alpha)\,[T(\alpha) - T_p]\, d\alpha$$

and $$\Phi(\alpha) = \frac{1}{720} \int_0^{720} h(\alpha)\,[T(\alpha) - T_p]\, d\alpha$$

in which $\overline{\phi}$ is the average heat flow density and $h(\alpha)$ is the transfer coefficient which depends on the temperature and the pressure.

Figure 18:
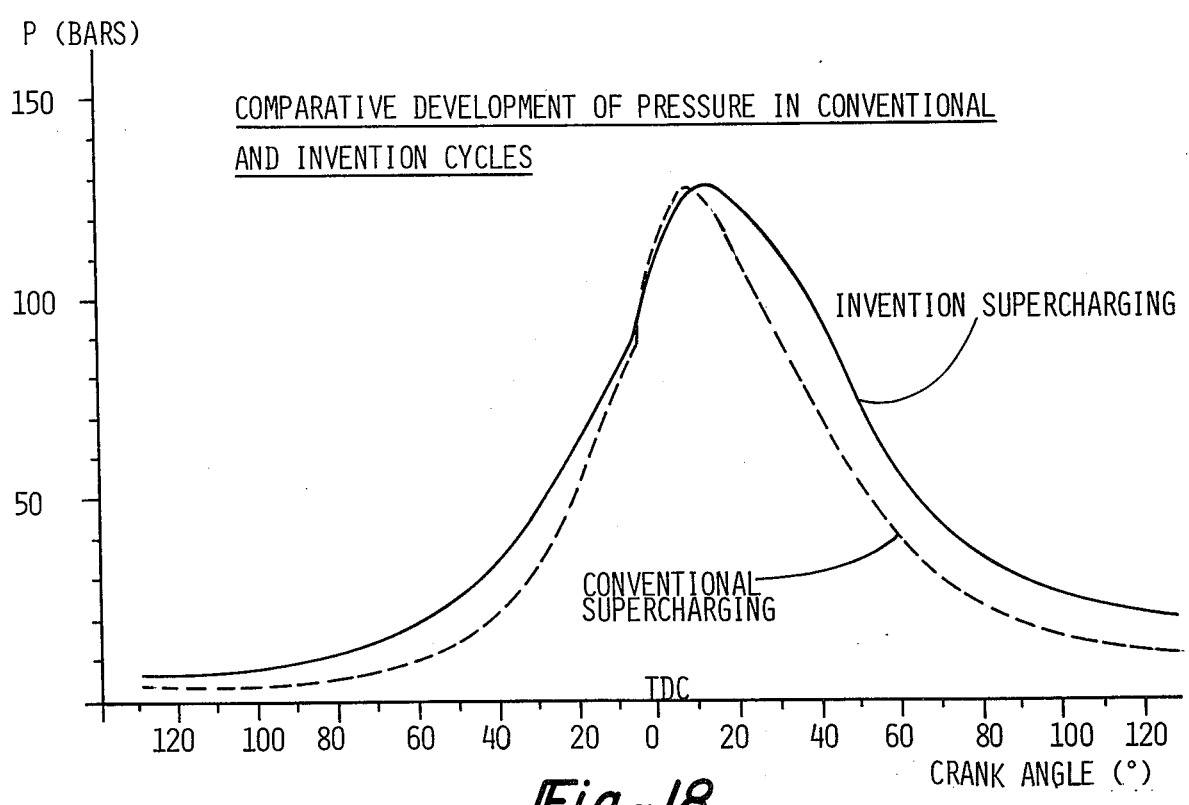
FIG. 18 is a graphic comparative development of supercharging pressure versus crank angle for engines supercharged conventionally and pursuant to the invention.
Figure 19:
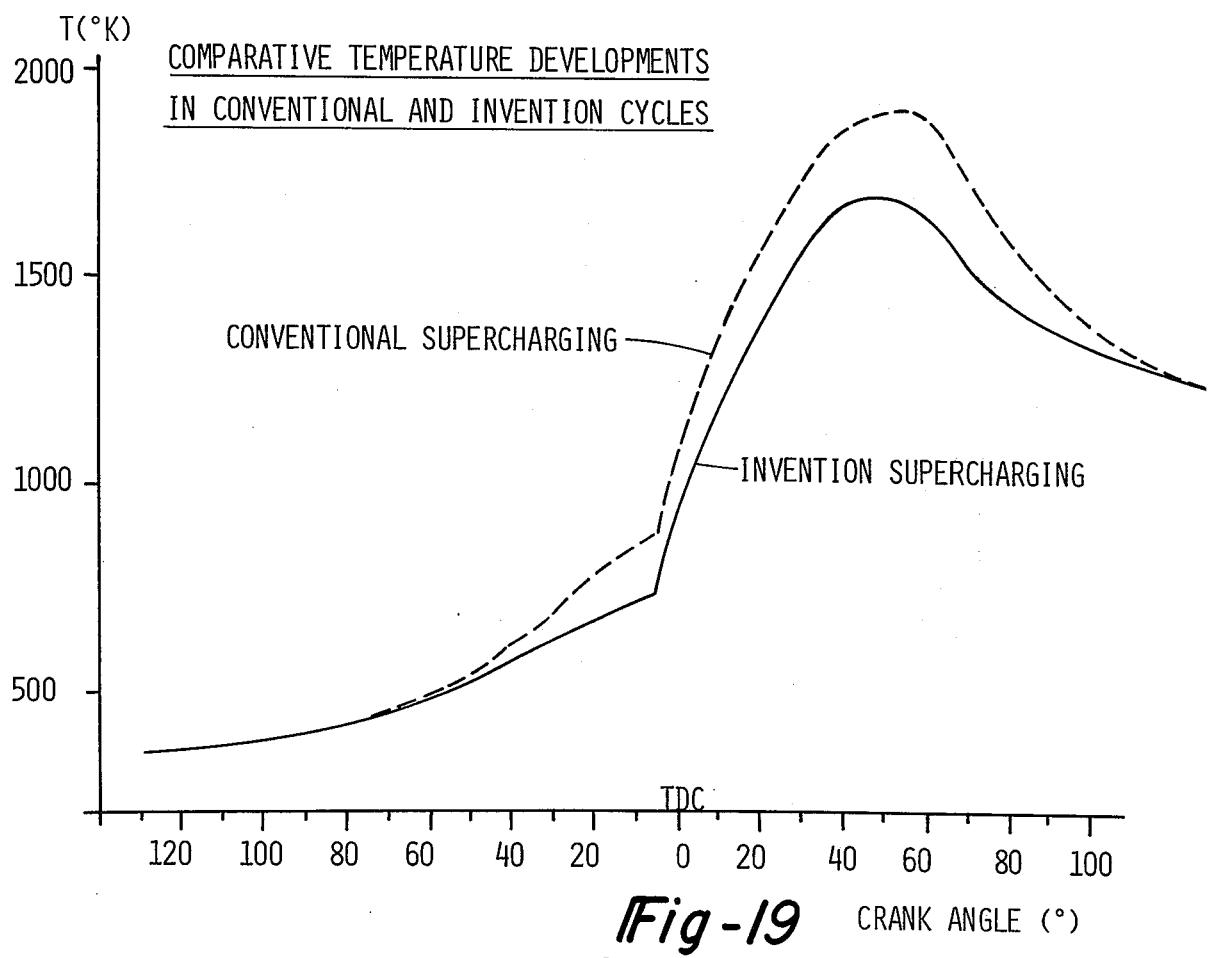
Figure 20:
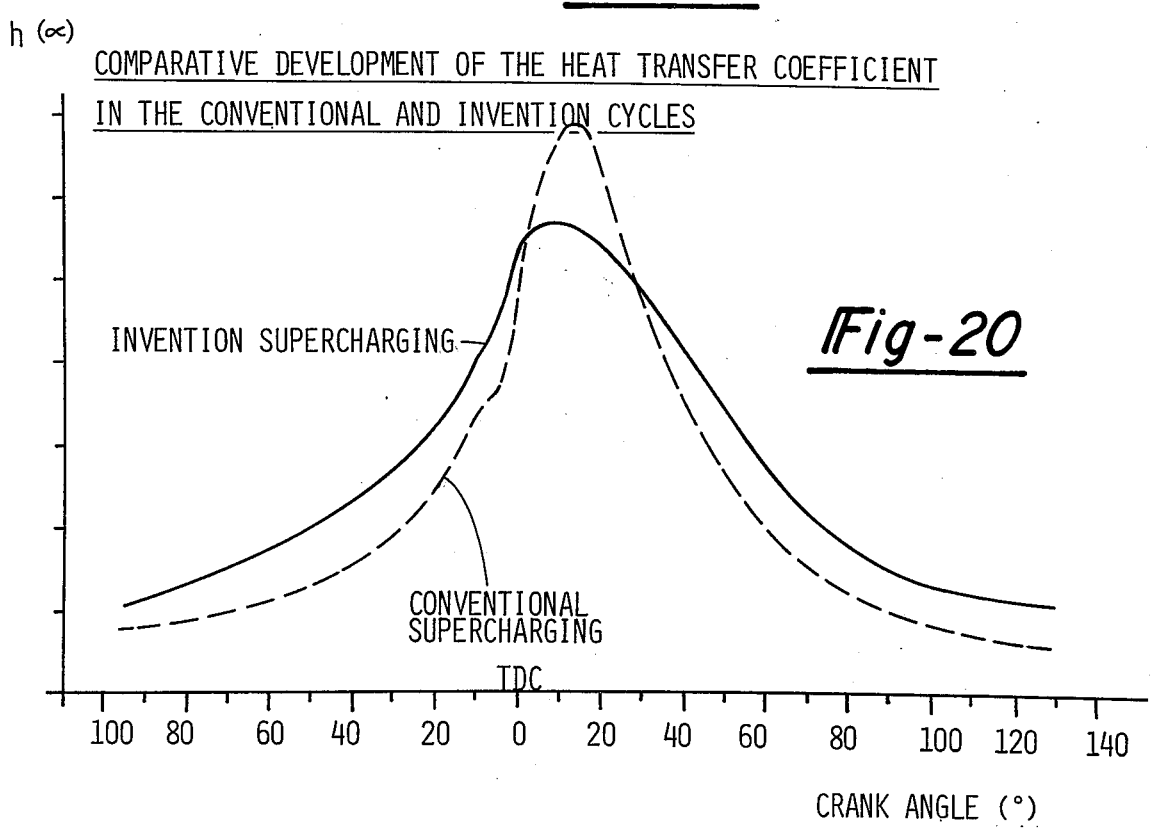

Referring to the set of graphs in the accompanying drawings, FIG. 18 gives the comparative theoretical developments of pressure in the conventional cycle and in the cycle of the invention, FIG. 19 gives the corresponding theoretical temperature developments, FIG. 20 gives the corresponding theoretical developments of the transfer coefficient, and FIG. 21 gives a comparison of the theoretical heat flow density at the point concerned for a wall temperature of 260° C. It will be seen that the top of a cylinder in an engine of the invention developing a mean effective pressure (M.E.P.) ranging about 30 bars is cooler than that of the same conventional cylinder at an average pressure of 20 bars. This is chiefly due to a decrease in combustion temperatures which influence to the fourth power the energy radiated toward the walls.

With respect to the thermal balance of the engine cycle of the invention and its effects on the cooling system, reference may be made to the following tables which give a comparison between the theoretical temperatures (Table 1) and theoretical heat flows (Table 2) of the same engine in conventional supercharging and in supercharging pursuant to the invention:

TABLE 1

| Temperatures | Conventional | Invention |
|---|---|---|
| Supercharging pressure | 3 bar | 6 bar |
| Air consumption | 5.2 Kg/H.P./H | 6.0 Kg/H.P./Hour |
| Mean effective pressure | 17 bar | 30 bar |
| Intake temperature | 15° C | 15° C |
| Compressor output temperature | 165° C | 270° C |
| Engine intake temperature | 60° C | 80° C |
| Turbine intake temperature | 580° C | 600° C |
| Turbine output temperature | 450° C | 350° C |

TABLE 2

| Thermal Balance (in % of fuel enthalpy) | | |
|---|---|---|
| Brake power | 36.5% | 36.5% |
| Power removed by cooling air | 7.5% | 15.5% |
| Power losses in water and oil | 16.5% | 9.5% |
| Exhaust losses | 33% | 29.5% |
| Other losses | 6.5% | 9% |

It will be seen from Table 2 that 62% (15.5/15.5 +9,5) of the heat to be extracted is in the supercharging air, with the invention, and only 31% (7.5/7.5 + 16.5) with conventional supercharging. These calories are at high temperature, so they are easily evacuated if a direct exchange is made with the cold source (atmosphere or external water). The average theoretical temperature differences are given in the following Table 3:

TABLE 3

| Fluid to be Cooled | Conventional | Invention |
|---|---|---|
| Cylinder block cooling water and lubricating oil - Input/output temperature of coolant | 94° C\80° C | 94° C\80° C |
| Mean temperature difference with cooling air at 40° C | 47° C | 47° C |
| Power to be extracted as % of engine power | 45% | 26% |
| Size of cooler | 91 | 55 |
| Supercharging air - Intake/output cooler temperatures | 160° C\60° C | 270° C\80° C |
| Mean temperature difference with cooler fluid (air at 40° C) | 70° C | 135° C |
| Power to be extracted as % of engine power | 25% | 43% |
| Size of cooler | 30 | 32 |
| Overall size of coolers | 121 | 87 |

To summarize the above considerations, it will be seen that the reduction of the compression ratio has three favorable effects on the thermal load: (1) at equal temperatures in the intake, it decreases the heating of the air during compression and, therefore, the temperature at the beginning of combustion; (2) for given values of maximum pressure, brake mean effective pressure and intake temperature, it enables the excess of air to be chosen to reduce the combustion temperature and the heat transfer by radiation; and (3) at equal supercharging pressures, it reduces all pressure levels and, therefore, the value of the gas to wall heat transfer coefficient.

Another factor to consider in supercharging is the choice of intake temperature. Chemical kinetics imposes end of compression conditions such that the ignition delay must be sufficiently short under all operational conditions and in particular during operation at no load. This delay depends on the pressure and temperature of compression which in turn depend on the conditions of intake and on the volumetric ratio. Below a certain volumetric ratio, which varies with the bore (12 for the largest, 17 for the smallest), the intake pressure and temperature must therefore be artificially maintained above ambient conditions in order to ensure a good ignition of the fuel in the engine. It is possible to act upon the temperature alone, or on the pressure alone or on both simultaneously.

The effect of temperature alone is relied upon in the conventional heating of the intake manifolds in order to facilitate starting. For very low volumetric ratios, the compression pressure may drop below 10 bars. The necessary intake temperature for correct ignition may then exceed 300° C. The density of intake air is then halved and this has two detrimental effects: (1) an increase of intake temperature facilitating ignition is accompanied by a decrease in the density of oxygen which is unfavorable to ignition; and (2) the average pressure may become inadequate to accelerate the engine.

Since every compression is accompanied by heating, the case of the effect of pressure alone has to be considered only if the air coolers are very cold, which is the case on starting. Starting is then only possible with an intake pressure requiring an oversized starting mechanism.

However, in accordance with the present invention, there is a simultaneous effect of temperature and pressure in obtaining the proper intake temperature. This is very simply achieved by momentary bypassing of the air coolers during starting and heating periods of the engine, as set forth in more detail in my copending application Ser. No. 263,759, filed June 7, 1972 and entitled "Improvements in Supercharged Diesel Engines and in Methods of Starting Them" which was abandoned in favor of continuation application Ser. No. 464,391, filed Apr. 26, 1974, now U.S. Pat. No. 3,894,392, issued July 15, 1975.

In considering the performances possible with the supercharging system of the invention, the performances have been calculated for an engine designed to have a combustion pressure of 135 bars and a temperature inside the cylinder of 900° C at the time of exhaust opening. A brake mean effective pressure greater than 30 bars may be expected in the near future. FIG. 22 shows the theoretical indicated mean effective pressure (I.M.E.P.) as a function of the supercharging pressure and of the angular duration of combustion. This diagram reveals the considerable influence of rotary speed on the average pressure of diesel engines. Thus, high speed engines are very limited by chemical kinetics. However, it is to be noted that the excess of air in the cycle of the invention is used to accelerate the end of combustion, thereby tending to offset a drop in the indicated mean effective pressure with increasing engine speed.

With respect to the effects of supercharging pursuant to the present invention on the mechanical operation of the engine, it will be understood that the combustion diagram is fairly comparable with that of a spark ignition engine and hence gives the engine smooth operation and a low ratio between maximum and average pressure. Moreover, the specific losses by friction are reduced in the same ratio as the mean effective pressure. As a result, the mechanical efficiency is increased by about 10 points.

The effects of supercharging pursuant to the present invention on specific fuel consumption may be considered surprising because it is generally assumed that a reduction in the compression volumetric ratio is necessarily accompanied by an increase in fuel consumption. This is not true, the proof being that a supercharged engine consumes less than in the aspirating version, in spite of its lower volumetric ratio. Without going into a strict study of thermal efficiency, it should be pointed out that factors favorable to supercharging in accordance with the present invention balance the unfavorable effect of the reduction in the engine compression ratio. For example, the specific losses in the engine cooling water and oil are approximately halved, the mechanical efficiency is increased by about 10 points, and the specific losses by radiation and convection are approximately halved. Although at the present time there is a lack of experimental results on very low volumetric ratios, it is probable that supercharging pursuant to the present invention does not appreciably change the specific fuel consumption even at such very low ratios.

As briefly indicated previously, optimum results from the supercharging system of the invention are obtainable only if the compressor operating point moves along a line very close to the surge zone. Such a mode of operation of the compressor is impossible if the engine were to be connected in series between the compressor and the turbine. It is known, in fact, that the permeability of the engine varies to a very great extent according to running speed, load, overlap time, etc. In addition, the transient operations of the engine associated with the inertia of the blower rotor frequently entail surging of the compressor which is not desirable for high pressure engines.

The system of the invention avoids this difficulty by controlling the pressure drop between the compressor and the turbine by means of an engine bypass duct such that the permeability of the compressor-turbine air flow circuit is rendered independent of the engine operation. This concept also assumes the use of a supercharging system of the constant pressure type, which is in any case necessitated by consideration of the efficiency of expansion. The simplest version is a widely open tube without any structure for varying its flow characteristics, i.e., a simple pipe of fixed geometry, as shown and described in conjunction with FIGS. 1–8 which is large enough in cross section to produce no appreciable pressure loss. However, this attractive solution does not permit scavenging of the engine, and therefore for scavenging applications the modifications shown and described in FIGS. 9–13 are preferably employed.

From the foregoing description, it will be understood that the choice of very low volumetric ratios requires that intake pressure and temperature never decrease below certain values which are higher than ambient values. However, in the system of the invention, these conditions are fulfilled between the compressor 2 and the combustion chamber 3 of the gas generator of the turbine 4 whose idling is correctly adjusted. In a sense, the, pursuant to the present invention supercharging consists in making the engine breathe in this artificial atmosphere in the same way as a deep-sea diver in his diving suit.

The supercharging system of the invention assumes that for maximum benefits a very high intake pressure, 6 to 7 bars, will be in common use in the near future. At such pressure ratios, the energy available in the exhaust gases at 600° C will not be sufficient to drive the compressor unless the isentropic efficiencies of compression and expansion are high and the pressure loss between the compressor and the turbine is moderate. It is also known that a transonic or supersonic compressor has a good yield only in the immediate vicinity of its surge line as shown by the characteristic field of FIG. 23.

Thus, such elevated boost pressures achieved by the present invention are not possible unless the compressor operates very close to maximum efficiency. It is not simply a matter of finding a pump which will give high enough pressures. Rather, it goes to the basic operation of the compressor. To achieve the necessary pressures, the compressor must operate at about 75% of efficiency, and what this means is that the pump must be permitted to work very close to its "pumping" or surge line. In order to understand why it is not practicable to use turbocompressors with very high compression ratio (of the order of 5 to 7 or more) without operating very close to the surge line, it first should be noted that, as indicated above, if the isentropic yield of the compressor is 0.8 (close to the pumping line) the autonomous temperature at the input of the turbine, enabling the compressor to be driven, is of the order of 600° C. This relatively low input temperature condition of a compressor operating at high efficiency can be obtained with the diesel engine alone, without the outside addition of energy to the combustion chamber (the rotary speed of the turbine remains limited: N = 80,000 revs/min for example). However, if a turbocompressor cannot be operated close to the surge line, such as for reasons of stability of the turbocompressor, i.e., pumping in the case of sudden reduction in the permeability of whatever passageway or passageways are provided between the compressor and turbine, the yield will be bad, for example $n = 0.6$. In order to drive the compressor at this lower yield factor, an input temperature at the turbine of about 900° C is required in order to provide the energy necessary at the turbine. This thermal level cannot be obtained with the diesel gases alone because the cylinder head, pistons and especially the exhaust valves could not withstand this temperature level. Thus, the normal maximum temperature of the exhaust gas is between 550° C and 650° C. It would therefore be necessary to continuously heat the diesel exhaust gases with a combustion chamber in order to raise the temperature of the gases from 600° C to 900° C or higher. Increasing the heating of the exhaust gases by 300° C would increase by 20% the consumption of fuel of the installation. This, of course, would be very expensive and would have to be supplied to the nominal power of the engine, that is to say, throughout its use. In addition, the speed of the turbine would be very high (of the order of 100,000 revs/min in the above example), and the higher turbine inlet temperature would require more expensive materials.

Figure 23:
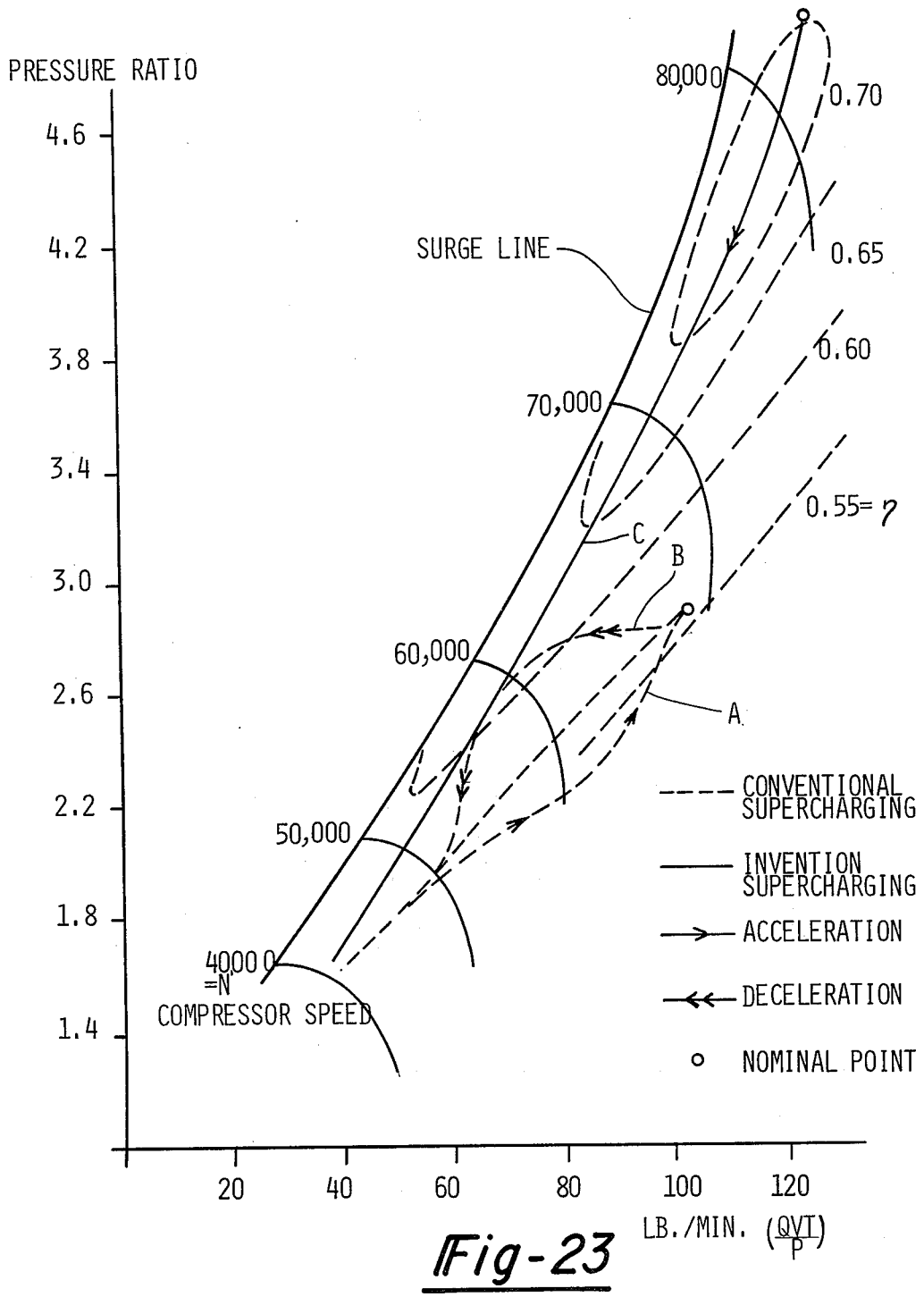
FIG. 23 is a graph of the paths of operative points of a turbocompressor in its characteristic field as operated in conventional supercharging and in supercharging pursuant to the invention.

Thus, to operate at a very high pressure level with energy derived only from the diesel gases, taking into account the permissible heat level at the engine exhaust (about 600° C), it is necessary to operate with a very good yield (of the order to 75%) and thus very close to the surge line. FIG. 23 illustrates diagramatically the operating characteristics of a compressor suitable for supercharging. The pump has a surge line and the closer the pump can operate to that surge line the greater its operating efficiency. However, once the pressure conditions exceed (move to the left of) the surge line, there is a back flow which totally disrupts the smooth flow of air through the compressor.

It must now also be appreciated that a diesel engine connected in series to a compressor acts like a throttling restriction when during running the speed of the engine suddenly moves from high speed to low speed conditions. The result in such prior art systems is surging at the compressor which can easily damage the compressor and the engine. In recognition of this problem, the prior art has operated far to the right of the surge line, as indicated by curves A and B. Curve A representing acceleration and curve B representing deceleration. In contrast thereto, however, the present invention operates close to and parallel to the surge line without danger of surging, as shown at curve C, due to the provision of the constantly open gas flow bypass between the compressor and the turbine. Since, as described in conjunction with FIGS. 1–8, this bypass must clearly provide a passage for the output of the turbocompressor on starting the latter, without appreciable pressure losses, it must obviously be a wide bypass; i.e., large enough in cross section to avoid acting in any appreciable manner as a fixed throttling orifice. In this way, variations in engine speed do not substantially affect the air flow-rate through the compressor. Rather, this bypass, which is always open, instantly accepts a greater portion of the air flow leaving the compressor when the engine speed is reduce, and a fortion when it is suddenly drastically reduced, so that the turbine input or compressor output can remain essentially unobstructed, thereby permitting smooth high-yield operation of the compressor near its surge line.

Although the prior art shows various bypasses in supercharging systems, none of these show a bypass having the permeability property of the above-described bypass passageway of the present invention, perhaps because it was mistakenly though that a direct constantly open bypass would render the aerodynamic flow so unstable that the diesel engine would reaspirate its exhaust gases through the bypass. However, it has been found that such a condition does not occur. To the contrary, it has been found that an always-open bypass in which the pressure drop is independent of air flow in the bypass can alone ensure the aerodynamic adaptation of two so incompatible machines as a volumetric machine (diesel engine) and a turbo machine (turbo-compressor) when these diverse machines are properly matched pursuant to the invention. It will be understood that the invention, whether applied to scavenged or nonscavenged engines, assumes that the turbine-compressor supercharger has been properly selected or matched to the engine to provide for any condition of engine operation at least some air flowing from the compressor to the turbine via the bypass branch even at maximum air flow condition through the engine combustion chamber system.

The invention will be better understood from the following description of the operation with reference to the relationship between boost pressure versus percentage of maximum power. Owing to the fact that the low compression ratio engine will not develop sufficient pressure with atmospheric air for self-ignition at starting and low power conditions, the turbocharger is first started (by, for example, the separate starting means 6 shown schematically in FIG. 1). At this time the air from the compressor flows only through the bypass (which is, of course, very wide) since the engine has not yet started. Fuel is delivered to the combustion chamber for operating the turbine so that there is developed at the compressor outlet a pressure of 2 atm which in the present instance is the boost pressure sufficient for self-ignition at starting and low speed conditions. At this point, the engine is started and this 2 atm pressure is delivered to the intake manifold of the engine whereby self-ignition now commences. In the example, the boost pressure of 2 atm represents the minimum or "threshold" value below which the boost pressure should not be permitted to fall lest the pressure at the engine be insufficient for self-ignition at starting and low power. This threshold value will depend on the structural dimensions, i.e., the compression ratio and bore, of the engine and will be fixed for a given engine. Moreover, this threshold value of pressure represents a certain speed of the turbine, and hence maintaining a minimum threshold value of boost pressure is directly translated into preventing the turbine speed from falling below a known minimum number of revolutions per minute.

In the preferred embodiment, maintenance of the threshold pressure value is thus accomplished by delivering sufficient fuel to the combustion chamber 3 to heat the gases entering the turbine a sufficient amount to maintain the threshold pressure of the gases and hence the corresponding threshold speed of the turbine. This threshold value is maintained essentially constant from zero to about 20% of full power. Additional fuel could continue to be delivered to the combustion chamber 3 while the boost pressure rises continuously from 2 atm at zero power to 4.8 atm at 100% power, but this would be a waste. As noted, the fuel delivered to the combustion chamber 3 provides sufficient heat in the bypass to maintain the gases entering the turbine at a sufficient temperature to give a compressor outlet pressure of 2 atm. However, as the engine moves from 0 to 20% of full power, hot gases start to leave the diesel engine and enter the turbine. Thus, the amount of fuel to the combustion chamber 3 required to maintain the 2 atm boost pressure drops off from an initial level at zero power (before the engine has started) to zero at 20% of full power. Above about 20% of full power, if the efficiency of the turbocompressor assembly is high enough, the exhaust gases from the engine are sufficient to maintain and increase the turbine speed and hence also the boost pressure without additional fuel in the combustion chamber 3, resulting in rising boost pressure with increasing power.

It is, of course, apparent from the previous description that variations in the fuel supply need not be continuously dependent on the turbine speed. The only essential function of the regulating device 7 used in the present invention is to assure that the compressor outlet does not fall below a predetermined minimum pressure which in turn means insuring that the turbine speed does not fall below a minimum predetermined speed which minimum speed is fixed for a given engine, all other parameters affecting self-ignition being kept constant. Thus, taking such parameters into account, this means that by way of example, fuel must be delivered to the combustion chamber 3 in sufficient amount to assure that the turbine does not fall below 50,000 r.p.m. Therefore, this amount could be a constant amount but with unnecessary waste of fuel which could be avoided by a regulating device.

Regulating devices for relating compressor pressure or turbine speed to a combustion chamber fuel supply are conventional and hence will be well known to one skilled in the art. For example, the U.S. Pat. Nos. to Prince 2,379,455, Nettel 2,654,991 and Zuhn 3,096,615 describe regulating means which respond to the pressure delivered by the compressor. The Nettel U.S. Pat. No. 2,620,621 and the Dumont U.S. Pat. No. 3,163,984 disclose regulating means responsive to the temperature at the input of the turbine. However, an operative link between the turbine-compressor supercharger and the combustion chamber as disclosed in conjunction with FIGS. 10–13 herein are preferred, at least in supercharging systems of the invention requiring scavenging.

Figure 24:
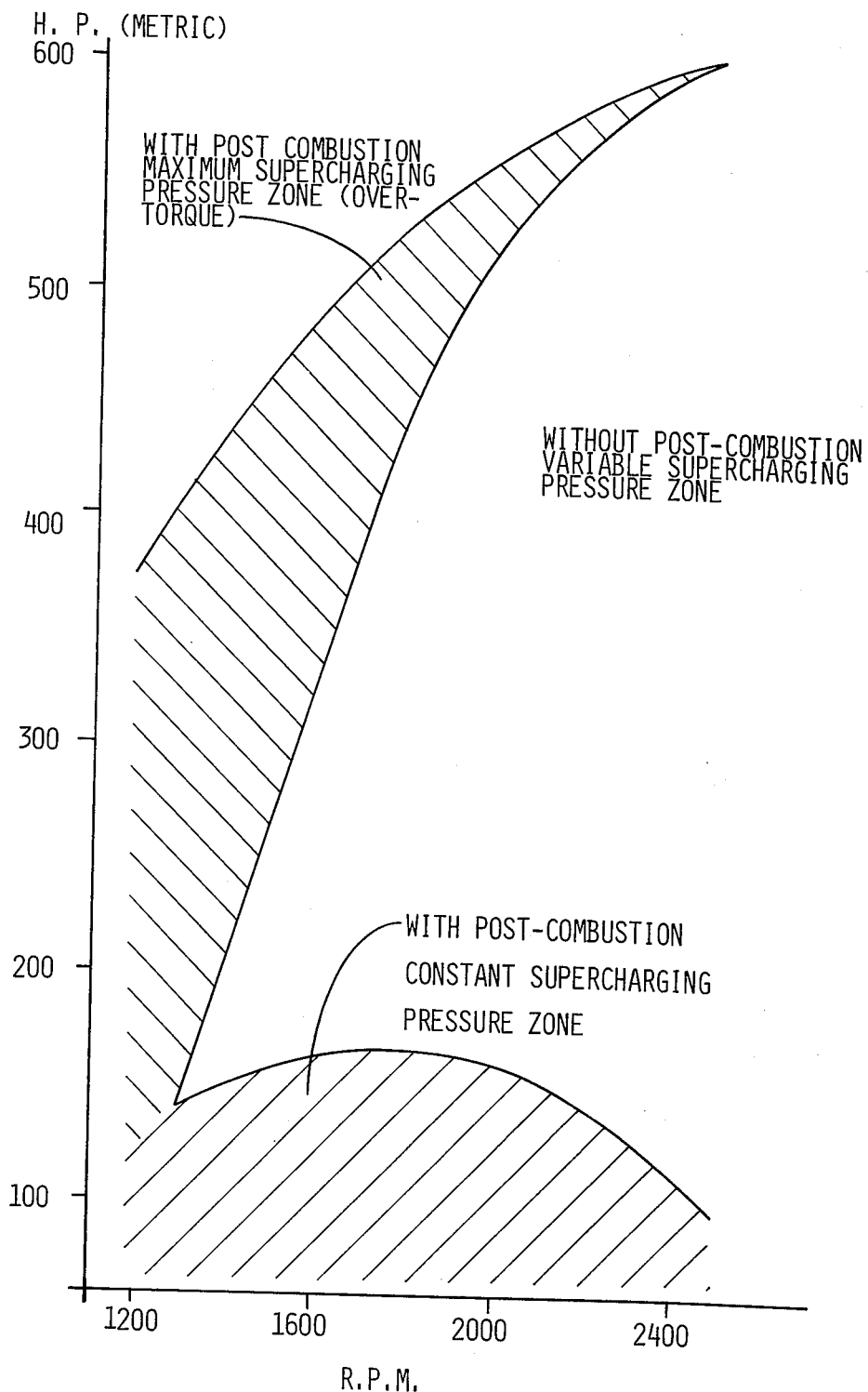
FIG. 24 is a graphic illustration of three phases of operation of engine operated pursuant to the method of the invention depicted as plot of horsepower versus engine r.p.m.

The operating sequences of the hybrid assembly of the invention can also be graphically summarized as shown in FIG. 24. First, as explained previously, the gas turbine is started up and made self-sustaining with the combustion chamber 3. Then the diesel engine 1 is started by conventional means (electric or pneumatic starter) and while idling provides no significant power to the turbine. However, once the diesel engine is placed under load, there can be three general phases. Referring to FIG. 24, there is a constant supercharging pressure phase. This phase corresponds approximately to the range of power between 0 and 20% of the maximum power at which the engine takes over from the combustion chamber. Secondly, there is a variable supercharging pressure phase. In this zone, between 20 and 100% of its power, the engine works as a gas turbine combustion chamber whose pressure loss is controlled. Thirdly, for traction applications where high torque at low running speed is desirable, a maximum supercharging pressure phase may be obtained by an overriding order to the fuel regulator.

From the foregoing description it will now be apparent that one important advantage of the system of the invention is that it can be applied to almost all existing engines. The transformation of a conventional engine to the method of the invention essentially affects its environment and its equipment. The exhaust manifold is the thermodynamic heart of the hybrid machine. It contains the combustion chamber and its control parts. Thus, at the cost of minor modifications, the invention multiplies the power of nonsupercharged engines by a factor between 3.5 and 4 in the present state of technology without reducing the life of the engine. Moreover, anticipated progress from current work to extend the limits of conventional supercharging will be directly usable by supercharging systems of the invention and with an increase in the relative gain.

Since the supercharging method and system is dependent on the existence of high pressure turboblowers for maximum benefits, it is anticipated that the invention will be the main industrial application of recent developments in supersonic centrifugal and axial compressors. In this respect, turbocompressors must now be classified by the type of turbine with which they are equipped. The radial turbine, capable of high expansion rate, is well adapted to the supercharging system of the invention. Unfortunately, its gas flow is limited and hence it is usable only for small power units. Today there are a few machines in this category whose pressure ratio exceeds 5. One of such radial turbines (Microturbo TCS 14) was used to equip the Poyaud 520-6L S3 engine described previously in conjunction with FIGS. 14–16 which develops a means effective pressure of 21 bar at 2,500 r.p.m., i.e., a power factor of 60 h.p. per liter of displacement in continuous operation.

The axial turbine is restricted by an expansion ratio of about 2.5. Thus, it is expected that turboblowers for high powered engines of the invention will be equipped with a turbine having two axial wheels and an axial compressor followed by a centrifugal compressor. However, until such time as such turbines are available, supercharging of some engines pursuant to the invention may be accomplished with to series-mounted turboblowers.

It is also to be understood that the supercharger air cooler must be redimensioned for the new conditions at the compressor outlet. Water cooling may be retained when the cold source is natural water (maritime propulsion) or when it is at some distance from the engine. In this case, present technology may be retained. Air cooling is always preferable when the cold source is the atmosphere (railway traction). For this air/air exchanger brazed steel should be selected rather than light alloy which loses its mechanical properties above 300° C.

It thus will now be appreciated that the method and system of the invention lies at the crossroads of two rapidly evolving technologies — turbomachines and heat exchangers — and of the well-established conventional technology of the diesel engine which benefits from an enormous accumulated experimental knowledge. Pursuant to the present invention, and contrary to a widespread idea, the gas turbine is not a competitor of the diesel engine but is its opportune complement. After a very spectacular development in the aeronautical field, the gas turbine is today much closer to its asymptotic performances than the diesel engine. In fact, if the laws of similarity which govern the dimensions of diesel engines are taken into account it will be observed that by doubling the average pressure for a given rotary speed, supercharging pursuant to the invention reduces the weight and bulk by a factor $2\sqrt{2} = 2.83$. This allows a weight to power ratio of 1.4 Kg. per horsepower to be anticipated in the near future for industrial engines with a power of less than 1500 h.p., decreasing even to much less than 1 Kg. per horsepower for light engines. Moreover, apart from this gain in performance, which places the diesel engine at the same level as the industrial turbine with a heat recovering system, supercharging pursuant to the invention assists in reducing the price per kilowatt installed and this is always an advantage.

From the foregoing description and drawings, it will now be understood that the various species of the invention disclosed herein embrace a generic concept or concepts with respect to the manner in which supercharging is performed according to the method of the invention and accomplished by the structure of the invention. The bypass, whether it be a simple wide open pipe of fixed dimensions or geometry, as shown for example in FIG. 1, or a bypass of regulated variable cross section, as shown for example in FIG. 9, is selected to have, or is provided with, air flow characteristics matched to the output of compressor 2 or 103 such that any appreciable pressure difference developed in the air passing through the bypass is generally independent of the ratio of the flow rate of the air traversing the bypass to the total air flow delivered from the compressor. Thus, in the case of the constantly wide open bypass of fixed dimensions shown in FIG. 1, the bypass, as indicated previously herein, is made large enough in flow capacity so as to permit the whole of the flow of air delivered by the compressor to pass without appreciable pressure drop regardless of the speed of the engine, a condition which necessarily follows from the previously described operation of the turbo-compressor 2–4 at the aforementioned minimum threshold speed both while the engine 1 is running and while the engine 1 is stationary (and thus acting as a closed valve in the branch of the compressor-turbine flow path which passes through the combustion chamber system of engine 1).

In the event that a significant pressure drop is to be created in the bypass, the pressure drop must be controlled in accordance with the present invention by the previously described throttle means 108 or its equivalent so that such pressure drop is an increasing function of the pressure existing at the compressor outlet to thereby maintain such pressure drop independent of the ratio of the flow rate of the air traversing the bypass to the total air flow delivered from the compressor, or, stated another way, to the ratio of the flow rate of air traversing the bypass to the flow rate of air traversing the engine combustion chamber. Preferably, this is accomplished by suitably matching the turbo-compressor to the engine combustion chamber system and to the bypass so that the compressor always operates near enough to its surge line to optimize the efficiency of the compressor. Thus, for a given pressure ratio of the compressor (i.e., for a given power output of the engine), the air flow delivery of the compressor remains generally constant regardless of the rotary speed of the engine (i.e., fast, slow, stationary or accelerating or decelerating), thereby enabling operation of the compressor such that a plot of the pressure ratio of the compressor versus the air flow delivery of the compressor will lie generally along a line which extends generally parallel to the characteristic surge line of such compressor as shown in FIG. 23.

To summarize the above in slightly different terms, whether considered from the standpoint of proper selection of a permanently wide open bypass pipe of fixed dimensions with respect to a properly matched turbo-compressor and engine, which may be any of the arrangements shown in FIGS. 1–8 (which are particularly useful for nonscavenged engines), or a bypass having means for regulating the flow cross section such as shown in FIGS. 9–13 (which are useful for both scavenged and nonscavenged engines), the invention contemplates the correlation of the air flow permeability of the bypass with that of the engine combustion chamber system so that the combined air flow permeability or capacity of the parallel combination of air flow paths provided by the engine and by the bypass means remains substantially constant regardless of the speed, or the rate of change of speed, of the engine in order to obtain the efficiencies and advantages described hereinabove. Although the working examples particularly disclosed in the foregoing description deal with a method of supercharging an engine of the compression ignition (diesel) type, it will be evident from the foregoing disclosure to those skilled in the art that this general concept of very high supercharging of internal combustion engines, featuring the "high yield mode of operation of the turbo-compressor", which consists of controlling, by way of the above disclosed "by-pass system", the difference between the compressor outlet pressure and the turbine inlet pressure, is also applicable to any type of supercharged internal combustion engine of the expansible combustible chamber type.

I claim:

1. A method of supercharging an internal combustion engine of the expansible chamber type having a turbo-compressor system with at least one compressor and at least one turbine for driving the compressor, said engine having a combustion chamber system connected between the outlet of said compressor and the inlet of said turbine having an airflow capacity which varies as a function of engine r.p.m. and load, said method comprising the steps of:

a. directly communicating the outlet of said compressor with the turbine inlet by connecting a bypass passageway between said outlet and inlet in parallel airflow relation with the engine combustion chamber system;

b. establishing a substantially constant total airflow capacity between the compressor outlet and the turbine inlet for any given compressor outlet pressure by providing an airflow capacity in said bypass passageway adequate to automatically responsively compensate for the variations in the airflow capacity of the engine combustion chamber system caused by engine r.p.m. and load variations whereby the pressure difference, if any, between the compressor outlet and turbine inlet is generally independent of the ratio of the flow rate of the air traversing said bypass passageway to the total airflow delivered from said compressor;

c. matching said turbo-compressor system to the total airflow capacity of said engine combustion chamber system and of said bypass passageway such that the plot of the ratio of the compressor output pressure to the compressor input pressure versus the airflow delivered by the compressor, during self-sustaining operation of said turbo-compressor system and conjoint operation of the engine under its own power in response to any variation in engine load and r.p.m. within the complete operating range of the engine, lies at least within a narrow area approximating a predetermined curve located in a high yield area generally near to, but which does not exceed, the surge line characteristic of the compressor; and d. operating the engine under its own power and simultaneously operating the turbo-compressor system in a self-sustaining mode so as to deliver air from said compressor to said engine combustion chamber system and to said bypass passageway such that the aforementioned plot of the matched turbo-compressor lies within said narrow area.

2. The method of claim 1 wherein step (b) is performed by maintaining a fixed dimension of the flow controlling cross section of the bypass passageway and selecting such dimension so as to permit the whole of the flow of air delivered by the compressor to pass through said bypass passageway without appreciable pressure drop when the engine is stationary.

3. The method set forth in claim 1 wherein step (b) thereof is performed by controlling the flow characteristics of said bypass passageway so as to cause a pressure drop in the air passing through the said bypass which is an increasing function of the pressure existing at the compressor outlet.

4. The method set forth in claim 3 wherein said flow characteristics are controlled such that said pressure drop is an increasing linear function of the pressure existing at the compressor outlet.

5. The method set forth in claim 1 wherein said engine is of the compression ignition type having a compression ratio less than that necessary to achieve self-ignition of fuel with air admitted to said engine combustion chamber system at ambient temperature and pressure conditions, and wherein step (d) is performed while maintaining, at least when the engine is running under its own power, the rotational speed of the turbo-compressor at or above a minimum threshold speed sufficient to cause the compressor to deliver air to the engine combustion chamber system at correlated minimum temperature and pressure conditions high enough such that, when said air is compressed by said engine from a point at or near the beginning of the intake phase of the cycle of said engine to a point at or near the end of the compression phase of said cycle, self-ignition of fuel in the engine combustion chamber system is produced.

6. The method set forth in claim 3 wherein said engine is of the compression ignition type having a compression ratio less than that necessary to achieve self-ignition of fuel with air admitted to said engine combustion chamber system at ambient temperature and pressure conditions, and wherein step (d) is performed while maintaining, at least when the engine is running under its own power, the rotational speed of the turbo-compressor at or above a minimum threshold speed sufficient to cause the compressor to deliver air to the engine combustion chamber system at correlated minimum temperature and pressure conditions high enough such that, when said air is compressed by said engine from a point at or near the beginning of the intake phase of the cycle of said engine to a point at or near the end of the compression phase of said cycle, self-ignition of fuel in th engine combustion chamber system is produced.

7. The method set forth in claim 5 wherein step (d) is further performed by heating the gases before entering the turbine inlet by burning of fuel in the air stream delivered from the compressor outlet and downstream thereof and separately from the burning of fuel in said engine.

8. The method set forth in claim 7 wherein step (d) further includes the step of starting the turbo-compressor in rotation so as to initiate gas flow through said bypass passageway with sufficient input energy so that the turbo-compressor system becomes self-sustaining and delivers air to the engine combustion chamber system at said correlated minimum temperature and pressure conditions.

9. A method of operating a supercharged internal combustion engine of the compression ignition type which is subject to speed and load variations and which is supercharged by an associated turbine-compressor supercharger wherein the turbine drives the compressor such that the supercharger drive is mechanically independent of the engine, said engine having an air intake communicating with the compressor output and an exhaust conduit communicating with the turbine inlet and a gas flow path from the compressor to the turbine in bypass relation to said engine intake, said method comprising the steps of:

a. maintaining the rotational speed of the turbine-compressor supercharger, at least when engine is running under its own power, at or above a minimum threshold speed sufficient to cause the compressor to deliver air to the engine at correlated minimum temperature and pressure conditions high enough such that, when said air is compressed by said engine from a point at or near the beginning of the intake phase of the cycle of said engine to a point at or near the end of the compression phase of said cycle, self-ignition of fuel in the engine is produced, said minimum threshold speed having a fixed value for an engine having a given compression ratio, said minimum threshold speed being lower for an engine having a higher compression ratio and being higher for an engine having a lower compression ratio with all other conditions affecting self-ignition being constant;

b. operating said engine under its own power over a varying speed and load range while continuously supplying air from the compressor to the engine intake at or above said correlated minimum temperature and pressure conditions;

c. automatically maintaining the air flow capacity of said bypass gas flow path at a value correlated with that of said engine such that the combined air flow capacity of the parallel air flow paths provided by said engine and said bypass gas flow path remains substantially constant for any given compressor outlet pressure regardless of the rate of change of speed and load conditions of said engine; and d. driving the turbine at least after being started solely by sufficiently heating gases admitted to the turbine so as to operate said turbine-compressor supercharger in a high yield mode at or near its characteristic surge line whereby surging of said compressor is prevented despite sudden variations in the airflow capacity of the engine induced by variations in the load and speed conditions of the engine.

10. A method of supercharging an internal combustion engine of the expansible chamber type having a turbo-compressor with at least one compressor and at least one turbine for driving the compressor, said engine having a combustion chamber system connected between said compressor and said turbine, and a bypass passageway communicating with the outlet of said compressor and with the turbine inlet in parallel air flow relation with the engine combustion chamber system, said method comprising the steps of:
   a. operating the turbocompressor so as to deliver air from said compressor to said engine combustion chamber system and to said bypass passageway;
   b. simultaneously operating the engine under its own power;
   c. controlling the pressure difference between the compressor outlet and the turbine inlet by maintaining a sufficient air flow capacity in the bypass passageway so as to permit the entire air flow output of the compressor to pass through said bypass passgeway both when the engine is stationary and when the engine is running under varying conditions of load and speed such that for a given pressure ratio of the compressor or for a given power output of the engine the air flow delivery of said compressor remains generally constant regardless of the rotary speed and load conditions of said engine; and
   d. simultaneously operating said compressor such that a plot of the pressure ratio versus the air flow delivery of said compressor is generally along a line generally parallel to and sufficiently near its surge line to optimize the efficiency of said compressor.

11. The method set forth in claim 10 wherein step (c) is performed by selecting a fixed air flow capacity of said bypass passageway sufficient to accept the entire air flow output of said compressor without generating any appreciable pressure drop in said bypass even when the engine is stationary.

12. A method of supercharging an internal combustion engine of the expansible chamber type having a turbocompressor with at least one compressor and at least one turbine for driving the compressor, said engine having a combustion chamber system connected between said compressor and said turbine, and a bypass passageway communicating with the outlet of said compressor and with the turbine inlet in parallel air flow relation with the engine combustion chamber system, said method comprising the steps of:
   a. operating the turbocompressor so as to deliver air from said compressor to said engine combustion chamber system and to said bypass passageway with the compressor outlet pressure exceeding turbine inlet pressure;
   b. simultaneously operating the engine under its own power and admitting exhaust gases from the engine combustion chamber system to the turbine;
   c. generating hot gases as necessary externally of and separately from the burning of fuel in the engine combustion chamber and admitting the same along with the engine exhaust gases to the turbine to provide a supply of motive gases having sufficient temperature to cause the turbocompressor to operate in a self-sustaining mode;
   d. maintaining in said bypass passageway an air flow capacity responsive to any variation in the air flow capacity of said engine combustion chamber system caused by variations in engine load and r.p.m. such that the total air flow capacity provided by said bypass passageway and engine combustion chamber system is substantially constant for any given compressor outlet pressure whereby any appreciable pressure difference developed in the air passing through the bypass passageway toward said turbine is generally independent of the ratio of the flow rate of the air traversing said bypass passageway to to the total air flow delivered from said compressor and whereby for a given pressure ratio of the compressor the air flow delivery of said compressor remains generally constant regardless of the rotary speed and load conditions of said engine; and
   e. simultaneously operating said compressor such that a plot of the pressure ratio versus the air flow delivery of said compressor is generally within a narrow area generally parallel to its surge line.

13. The method as set forth in claim 9 wherein, in step (c), said bypass gas flow path is maintained in a permanently open condition.

14. The method of claim 9 wherein step (c) is performed by maintaining said bypass gas flow path constantly open via a bypass pipe having a fixed dimension of the flow controlling cross section thereof and selecting such dimension so as to permit the whole of the flow of air delivered by the compressor to pass through said bypass pipe without appreciable pressure drop when the engine is stationary.

15. The method set forth in claim 9 wherein step (c) is performed by controlling the flow characteristics of said bypass gas flow path so as to cause a pressure drop in the air passing therethrough which is an increasing function of the pressure existing at the compressor outlet.

16. The method set forth in claim 15 wherein said flow characteristics are controlled such that said pressure drop is an increasing linear function of the pressure existing at the compressor outlet.

17. The method set forth in claim 9 wherein said engine is of the compression ignition type having a compression ratio less than that necessary to achieve self-ignition of fuel with air admitted to said engine combustion chamber system at ambient temperature and pressure conditions.

18. The method set forth in claim 17 wherein step (a) is further performed by heating the gases before entering the turbine inlet by burning of fuel in the air stream delivered from the compressor outlet and downstream thereof and separately from the fuel burned in said engine.

19. The method set forth in claim 18 wherein step (a) further includes the step of starting the turbocompressor in rotation so as to initiate gas flow through said bypass gas flow path with sufficient input energy so that the turbocompressor becomes self-sustaining and delivers air to the engine combustion chamber system at said correlated minimum temperature and pressure conditions.

20. The method of claim 10 wherein step (c) is performed by maintaining a fixed dimension of the flow controlling cross section of said bypass passageway, maintaining said bypass passageway constantly open and selecting such dimension so as to permit the whole of the flow of air delivered by the compressor to pass through said bypass passageway without appreciable pressure drop when the engine is stationary.

21. The method set forth in claim 10 wherein step (c) is performed by controlling the flow characteristics of said bypass passageway so as to cause a pressure drop in the air passing therethrough which is an increasing function of the pressure existing at the compressor outlet.

22. The method as set forth in claim 21 wherein said flow characteristics are controlled such that said pressure drop is an increasing linear function of the pressure existing at the compressor outlet.

23. The method set forth in claim 21 wherein said engine is of the compression ignition type having a compression ratio less than that necessary to achieve self-ignition of fuel with air admitted to said engine combustion chamber sytem at ambient temperature and pressure conditions, and wherein step (a) is performed while maintaining, at least when the engine is running under its own power, the rotational speed of the turbocompressor at or above a minimum threshold speed sufficient to cause the compressor to deliver air to the engine combustion chamber system at correlated minimum temperature and pressure conditions high enough such that, when said air is compressed by said engine from a point at or near the beginning of the intake phase of the cycle of said engine to a point at or near the end of the compression phase of said cycle, self-ignition of fuel in the engine combustion chamber system is produced.

24. The method set forth in claim 20 wherein said engine is of the compression ignition type having a compression ratio less than that necessary to achieve self-ignition of fuel with air admitted to said engine combustion chamber sytem at ambient temperature and pressure conditions, and wherein step (a) is performed while maintaining, at least when the engine is running under its own power, the rotational speed of the turbocompressor at or above a minimum threshold speed sufficient to cause the compressor to deliver air to the engine combustion chamber system at correlated minimum temperature and pressure conditions high enough such that, when said air is compressed by said engine from a point at or near the beginning of the intake phase of the cycle of said engine to a point at or near the end of the compression phase of said cycle, self-ignition of fuel in the engine combustion chamber system is produced.

25. The method set forth in claim 24 wherein step (a) is further performed by heating the gases before entering the turbine inlet by burning of fuel in the air stream delivered from the compressor outlet and downstream thereof and separately from the burning of fuel in said engine.

26. The method set forth in claim 25 wherein step (a) further includes the step of starting the turbocompressor in rotation so as to initiate gas flow through said bypass passageway with sufficient input energy so that the turbocompressor becomes self-sustaining and delivers air to the engine combustion chamber system at said correlated minimum temperature and pressure conditions.

27. The method of claim 12 wherein step (d) is performed by maintaining a fixed dimension of the flow controlling cross section of said bypass passageway and selecting such dimension so as to permit the whole of the flow of air delivered by the compressor to pass through said bypass passageway without appreciable pressure drop when the engine is stationary.

28. The method set forth in claim 27 wherein step (d) is further performed by providing said bypass passageway in the form of a constantly wide open pipe having said selected fixed dimension of its flow controlling cross section.

29. The method set forth in claim 12 wherein step (d) thereof is performed by controlling the flow characteristics of said bypass passageway so as to cause a pressure drop in the air passing therethrough which is an increasing function of the pressure existing at the compressor outlet.

30. The method set forth in claim 29 wherein said flow characteristics are controlled such that said pressure drop is an increasing linear function of the pressure existing at the compressor outlet.

31. The method set forth in claim 27 wherein said engine is of the compression ignition type having a compression ratio less than that necessary to achieve self-ignition of fuel with air admitted to said engine combustion chamber system at ambient temperature and presure conditions, and wherein step (a) is prformed while maintaining, at least when the engine is running under its own power, the rotational speed of the turbocompressor at or above a minimum threshold speed sufficient to cause the compressor to deliver air to the engine combustion chamber system at correlated minimum temperature and pressure conditions high enough such that, when said air is compressed by said engine from a point at or near the beginning of the intake phase of the cycle of said engine to a point at or near the end of the compression phase of said cycle, self-ignition of fuel in the engine combustion chamber system is produced.

32. The method set forth in claim 29 wherein said engine is of the compression ignition type having a compression ratio less than that necessary to achieve self-ignition of fuel with air admitted to said engine combustion chamber system at ambient temperature and pressure conditions, and wherein step (a) is performed while maintaining, at least when the engine is running under its own power, the rotational speed of the turbocompressor at or above a minimum threshold speed sufficient to cause the compressor to deliver air to the engine combustion chamber system at correlated minimum temperature and pressure conditions high enough such that, when said air is compressed by said engine from a point at or near the beginning of the intake phase of the cycle of said engine to a point at or near the end of the compression phase of said cycle, self-ignition of fuel in the engine combustion chamber system is produced.

33. The method set forth in claim 12 wherein step (c) is further performed by heating the gases before entering the turbine inlet by burning of fuel in the air stream delivered from the compressor outlet and downstream thereof.

34. The method set forth in claim 31 wherein step (c) further includes the step of starting the turbocompressor in rotation so as to initiate gas flow through said bypass passageway with sufficient input energy so that the turbocompressor becomes self-sustaining and delivers air to the engine combustion chamber system at said correlated minimum temperature and pressure conditions.

* * * * *

UNITED STATES PATENT AND TRADEMARK OFFICE
CERTIFICATE OF CORRECTION

PATENT NO. : 3,988,894
DATED : November 2, 1976
INVENTOR(S) : Jean Melchior

Page 1 of 3

It is certified that error appears in the above–identified patent and that said Letters Patent are hereby corrected as shown below:

First Page: Add -- [30] FOREIGN APPLICATION PRIORITY DATA

May 5, 1970   France  70.16289
Apr. 6, 1972   France  72.12113
Mar. 21, 1973  France  73.10041 --

First Page: Add in [56] after "3,676,999 7/1972 Oldfield..60/606"

-- FOREIGN PATENTS OR APPLICATIONS 864443 4/1941 France --

First Page: Add in [56] after "Assistant Examiner-L.J.Casaregola"

-- Attorney, Agent or Firm - Barnes, Kisselle Raisch & Choate --

Column 1, line 45 - Cancel "diesal" and insert -- diesel --
Column 3, line 7 - Cancel "ex-" and insert -- com --
Column 3, line 65 - Cancel "is" and insert -- its --
Column 11, lines 11-15 - Cancel the expression (formula) and insert -- $\frac{s}{S} P - \frac{F + P_0 s}{S}$ --

UNITED STATES PATENT AND TRADEMARK OFFICE
CERTIFICATE OF CORRECTION

PATENT NO. : 3,988,894
DATED : November 2, 1976
INVENTOR(S) : Jean Melchior

It is certified that error appears in the above-identified patent and that said Letters Patent are hereby corrected as shown below:

```
Column 12, line 3  -  Cancel "pots" and insert -- ports --
Column 13, line 39 -  Cancel "K" and insert -- k --
Column 17, line 3  -  Cancel "membwe" and insert -- member --
Column 19, line 18 -  Cancel "W̄_E" and insert -- W̄_t --

Column 20, line 56 -- Cancel "Poyand" and insert -- Poyaud --
Column 21, line 56 -  Cancel "convenionally" and insert
                         -- conventionally --
Column 31, line 66 -  Cancel "fortion" and insert -- fortiori --
```

UNITED STATES PATENT AND TRADEMARK OFFICE
CERTIFICATE OF CORRECTION

PATENT NO. : 3,988,894
DATED : November 2, 1976
INVENTOR(S) : Jean Melchior

It is certified that error appears in the above-identified patent and that said Letters Patent are hereby corrected as shown below:

Column 10, line 10 - Cancel "a'" and insert -- $\alpha'$ --
Column 17, line 8 - Cancel "235a" and insert -- 243a --
Column 17, lines 41, 45, 53 and 61 - Cancel "Q" and insert -- q --
Column 22, line 11 - Cancel "134" and insert -- 314 --
Column 25, lines 62-65 - Cancel "$P_1(\alpha) = P_0(\alpha)$" and insert -- $P_y(\alpha) = P_0(\alpha) \cdot \pi$ --

Column 36, line 36 - Cancel "combustible" and insert -- combustion --

Signed and Sealed this

Eleventh Day of July 1978

[SEAL]

Attest:

RUTH C. MASON
Attesting Officer

DONALD W. BANNER
Commissioner of Patents and Trademarks